(12) United States Patent
Gardner et al.

(10) Patent No.: US 10,280,294 B2
(45) Date of Patent: May 7, 2019

(54) NANOFIBRIL-POLYMER COMPOSITES

(71) Applicant: University of Maine System Board of Trustees, Bangor, ME (US)

(72) Inventors: Douglas J. Gardner, Brewer, ME (US); Yousoo Han, Bangor, ME (US); Yucheng Peng, Evansville, IN (US)

(73) Assignee: University of Maine System Board of Trustees, Bangor, ME (US)

( * ) Notice: Subject to any disclaimer, the term of this patent is extended or adjusted under 35 U.S.C. 154(b) by 361 days.

(21) Appl. No.: 14/905,349

(22) PCT Filed: Jul. 17, 2014

(86) PCT No.: PCT/US2014/047100
§ 371 (c)(1),
(2) Date: Jan. 15, 2016

(87) PCT Pub. No.: WO2015/009972
PCT Pub. Date: Jan. 22, 2016

(65) Prior Publication Data
US 2016/0152811 A1    Jun. 2, 2016

Related U.S. Application Data

(60) Provisional application No. 61/847,751, filed on Jul. 18, 2013.

(51) Int. Cl.
| | | |
|---|---|---|
| *C08J 3/22* | (2006.01) | |
| *C08J 5/00* | (2006.01) | |
| *C08L 1/00* | (2006.01) | |
| *C08L 1/04* | (2006.01) | |
| *B29C 43/00* | (2006.01) | |
| *B29C 45/00* | (2006.01) | |
| *B29K 23/00* | (2006.01) | |
| *B29K 73/00* | (2006.01) | |
| *B33Y 10/00* | (2015.01) | |
| *B33Y 70/00* | (2015.01) | |
| *C08L 23/10* | (2006.01) | |
| *C08L 23/12* | (2006.01) | |
| *C08L 51/06* | (2006.01) | |
| *B29C 64/165* | (2017.01) | |
| *B29K 201/00* | (2006.01) | |

(52) U.S. Cl.
CPC ............ *C08L 23/12* (2013.01); *B29C 43/003* (2013.01); *B29C 45/0001* (2013.01); *B29C 64/165* (2017.08); *C08J 3/226* (2013.01); *C08J 5/005* (2013.01); *C08L 1/00* (2013.01); *C08L 1/04* (2013.01); *C08L 23/10* (2013.01); *C08L 51/06* (2013.01); *B29K 2023/08* (2013.01); *B29K 2023/14* (2013.01); *B29K 2073/00* (2013.01); *B29K 2201/00* (2013.01); *B33Y 10/00* (2014.12); *B33Y 70/00* (2014.12); *C08J 2323/12* (2013.01); *C08J 2451/06* (2013.01); *C08L 2205/16* (2013.01); *C08L 2310/00* (2013.01)

(58) Field of Classification Search
CPC .. C08L 23/10; C08L 1/00; C08L 51/06; C08L 1/04; C08L 23/12; C08L 2205/16; C08L 2310/00; B29K 2201/00; B29K 2073/00; B29K 2023/14; B29K 2023/08; B29C 45/0001; B29C 43/003; B29C 64/165; B33Y 10/00; B33Y 70/00; C08J 3/226; C08J 5/005; C08J 2323/12; C08J 2451/06
USPC .......................................................... 524/35
See application file for complete search history.

(56) References Cited

U.S. PATENT DOCUMENTS 8,372,320 B2    2/2013    Gardner et al.

OTHER PUBLICATIONS

Bahar, E. et al, Thermal and Mechanical Properties of Polypropylene Nanocomposite Materials Reinforced with Cellulose Nano Whiskers, Journal of Applied Polymer Science, 125(4): 2882-2889 (2012).
Gauthier, R. et al., Interfaces in polyolefin/cellulosic fiber composites: Chemical coupling, morphology, correlation with adhesion and aging in moisture, Polymer Composites, 19(3):287-300 (1998).
Gong, G. et al, Tensile behavior, morphology and viscoelastic analysis of cellulose nanofiber-reinforced (CNF) polyvinyl acetate (PVAc), Composites Part A: Applied Science and Manufacturing, 42(9): 1275-1282 (2011).

(Continued)

*Primary Examiner* — Angela C Scott
(74) *Attorney, Agent, or Firm* — Choate Hall & Stewart, LLP; Brian E. Reese; Meaghan E. Bychowski

(57) ABSTRACT

The present invention provides, among other things, compositions comprising nanofibrils, at least one maleic-anhydride (MA) copolymer and at least one matrix polymer, and methods of making such compositions. The provided methods and compositions allow for the production of composites with unexpectedly superior properties including improved impact resistance, tensile modulus of elasticity, tensile strength, and flexural modulus of elasticity as compared to previously known composites. In some embodiments, the present invention provides methods including the steps of providing cellulose nanofibrils, associating the cellulose nanofibrils with a maleic-anhydride (MA) copolymer to form a nanofibril-MA copolymer blend, preparing the nanofibril-MA copolymer blend for addition to a matrix polymer, and forming a composite by associating the nanofibril-MA copolymer blend with the matrix polymer, wherein the amount of cellulose nanofibrils in the composite is between 3% and 50% by weight of the composite.

16 Claims, 22 Drawing Sheets

(56) References Cited

OTHER PUBLICATIONS

International Search Report for PCT/US2014/047100, 4 pages (dated Nov. 26, 2014).
Kumari, R. et al, Fundamental studies on wood/cellulose-plastic composites: effects of composition and cellulose dimension on the properties of cellulose/PP composite, J. Wood Sci., 53(6): 470-460 (2007).
Lee, S.H. et al., Cellulose nanofiber-reinforced polycaprolactone/polypropylene hybrid nanocomposite, Composites Part A: Applied Science and Manufacturing, 42(2):151-156 (2011).
Missoum, K. et al., Nanofibrillated cellulose surface modification: A Review, Materials, 6:1745-66 (2013).
Simonsen, J. et al, Wood-Fiber Reinforcement of Styrene-Maleic Anhydride Copolymers, Journal of Applied Polymer Science, 68(10): 1567-1573 (1998).
Stenstad, P. et al., Chemical surface modifications of microfibrillated cellulose, Cellulose, 15(1): 35-45 (2008).
Written Opinion for PCT/US2014/047100, 6 pages (dated Nov. 26, 2014).
Belgacem, M. N. and Gandini, A., The surface modification of cellulose fibres for use as reinforcing elements in composite material, Composite Interfaces, 12(1-2): 41-75 (2005).
Dasari, et al. Microstructural aspects of surface deformation processes and fracture of tensile strained high isotactic polypropylene, Material Science and Engineering: A, vol. 358; 1-2:372-383 (2003).
Dijkstra, P.T.S. et al., A microscopy study of the transition from yielding to crazing in polypropylene, Polymer Engineering and Sci., 42(1): 152-160 (2002).

Ferguson, W., Why wood pulp is world's new wonder material, New Scientist, 2878: 24 (2012), retrieved on Apr. 23, 2018 <https://www.newscientist.com/article/mg21528786-100-why-wood-pulp-is-worlds-new-wonder-material/>.
Fu, S-Y. et al., Effects of particle size, particle/matrix interface adhesion and particle loading on mechanical properties of particulate-polymer composites, *Composites: Part B,* 39: 933-961 (2008).
Jam, N.J. and Behravesh, A. H., Flow behavior of HD PE-fine wood particle composites, J Thermoplastic Composite Materials, 20(5): 439-451 (2007).
Ljungberg, N. et al., New nanocomposite materials reinforced with cellulose whiskers in atactic polypropylene: effect of surface and dispersion characteristics, Biomacromolecules, 6:2732-2739 (2005).
Peng, Y. et al, Drying cellulose nanofibrils: in search of a suitable method, Cellulose, 19: 91-102 (2012).
Peng, Y. et al, Spray-Drying Cellulose Nanofibrils: Effect of Drying Process Parameters on Particle Morphology and Size Distribution, Wood and Fiber Science, 44(4): 1-14 (2012).
Qiu, W. et al., Interfacial interactions of a novel mechanochemical composite of cellulose with maleated polypropylene, J Appl. Polym. Sci, 94: 1326-1335 (2004).
Seo, Y. et al., Study of the crystallization behaviors of polypropylene and maleic anhydride grafted polypropylene, Polymer, 41: 2639-2646 (2000).
Shumigin, D. et al., Rheological and mechanical properties of poly(lactic) acid/cellulose composites, Materials Sci., 17(1): 32-37 (2011).
Yang, H-S. and Gardner, D. J., Mechanical properties of cellulose nanofibril-filled polypropylene composites, Wood Fiber Sci, 43(2):143-152 (2011).
Yang, H. S. et al., Characteristic impact resistance model analysis of cellulose nanofibril-filled polypropylene composite, Composites: Part A, 42: 2028-2035 (2011).

(A)

(B)

NANOFIBRIL-POLYMER COMPOSITES

CROSS-REFERENCE TO RELATED APPLICATIONS

This application claims priority to U.S. provisional patent application Ser. No. 61/847,751, filed Jul. 18, 2013, the disclosure of which is hereby incorporated by reference in its entirety.

GOVERNMENT FUNDING

This invention was made with government support under grant number CSREES ME09615-08MS, awarded by the U.S. Department of Agriculture. The government has certain rights in the invention.

BACKGROUND

The development of composite materials, including polymer composite materials, has been an area of intense research. In part, the development of these new materials is attractive because polymer composites, for example, reinforced by various fillers or additives, may be developed to exhibit improved and desirable mechanical properties useful in industries including, but not limited to the construction, transportation, industrial, and consumer application industries.

SUMMARY

The present invention provides, among other things, composite materials comprising nanofibrils, a maleic-anhydride (MA) copolymer and a matrix polymer, and methods of making such compositions. The provided methods and composite materials exhibit unexpectedly superior properties including improved impact resistance, tensile modulus of elasticity, tensile strength, and flexural modulus of elasticity, as compared to previously known composites.

In some embodiments, the present invention provides methods including the steps of providing cellulose nanofibrils, associating the cellulose nanofibrils with a maleic-anhydride (MA) copolymer to form a nanofibril-MA copolymer blend, preparing the nanofibril-MA copolymer blend for addition to a matrix polymer, and forming a composite by associating the nanofibril-MA copolymer blend with the matrix polymer, wherein the amount of cellulose nanofibrils in the composite is between 3% and 50% by weight of the composite. In some embodiments, the preparing step comprises drying the nanofibril-MA copolymer blend. In some embodiments, drying is spray drying.

According to various embodiments, preparing a nanofibril-MA copolymer blend for addition to a matrix polymer may take any application-appropriate form. In some embodiments, the preparing step includes drying the nanofibril-MA-copolymer blend, cooling the dried nanofibril-MA-copolymer blend, and granulating the dried nanofibril-MA-copolymer blend to form a nanofibril-MA-copolymer masterbatch.

It is contemplated that the conditions in which the associating step occurs may vary in accordance with the desired form and properties of the desired composite material. In some embodiments, the associating step occurs at a temperature between 130° C. and 220° C., inclusive. In some embodiments, the associating step comprises mixing of the cellulose nanofibrils and maleic-anhydride (MA) copolymer for between 1 minute and 60 minutes, inclusive.

Provided methods and compositions, according to various embodiments, may include the use of substantially dry components (e.g., nanofibrils, MA-copolymers, and matrix polymers) and/or the use of one or more components that are not dry, such as components in solution. In some embodiments, cellulose nanofibrils are in solution at the time of initiating the associating step. In some embodiments, maleic-anhydride copolymer comprises the dispersed phase of an emulsion at the time of initiating the associating step. In some embodiments, cellulose nanofibrils are substantially dry at the time of initiating the associating step. As used herein the term "substantially dry" means the nanofibrils (or other component) contain less than 1% moisture content based on the oven dry weight of the nanofibrils (or other component).

As described herein, various embodiments provide composites with improved properties. In some embodiments, provided composites are characterized as having an impact resistance that is higher than that of a composite consisting of the matrix polymer and cellulose nanofibrils. In some embodiments, the impact resistance of the composite is at least 20% (e.g., 25%, 30%, 35%, 40%, 45%, or 50%) greater than that of a composite consisting of the matrix polymer and cellulose nanofibrils.

In some embodiments, provided composites are characterized as having a tensile modulus of elasticity at least 35% higher than that of a composite consisting of the matrix polymer and cellulose nanofibrils. In some embodiments, provided composites are characterized as having a tensile strength at least 10% higher than that of a composite consisting of the matrix polymer and cellulose nanofibrils.

Any of a variety of maleic-anhydride copolymers are contemplated as within the scope of the present invention. In some embodiments, a maleic-anhydride polymer is selected from a maleic-anhydride olefin polymer and a maleic-anhydride polystyrene. In some embodiments, a maleic-anhydride olefin copolymer is maleic-anhydride polypropylene or maleic-anhydride polyethylene.

Those of skill in the art will recognize that there are a variety of ways to form composite materials. According to various embodiments, provided composites may be formed via any of a variety of processes. In some embodiments, a composite is formed via an extrusion, compression molding, injection molding, and/or fused layer modeling process (e.g., 3D printing).

The present invention also provides composite materials with improved properties. In some embodiments, the composite material is produced according to one of the methods described herein.

As used in this application, the terms "about" and "approximately" are used as equivalents. Any citations to publications, patents, or patent applications herein are incorporated by reference in their entirety. Any numerals used in this application with or without about/approximately are meant to cover any normal fluctuations appreciated by one of ordinary skill in the relevant art.

Other features, objects, and advantages of the present invention are apparent in the detailed description that follows. It should be understood, however, that the detailed description, while indicating embodiments of the present invention, is given by way of illustration only, not limitation. Various changes and modifications within the scope of the invention will become apparent to those skilled in the art from the detailed description.

BRIEF DESCRIPTION OF THE DRAWING

The Figures described below, that together make up the Drawing, are for illustration purposes only, and are not for limitation.

DEFINITIONS

Figure 1:
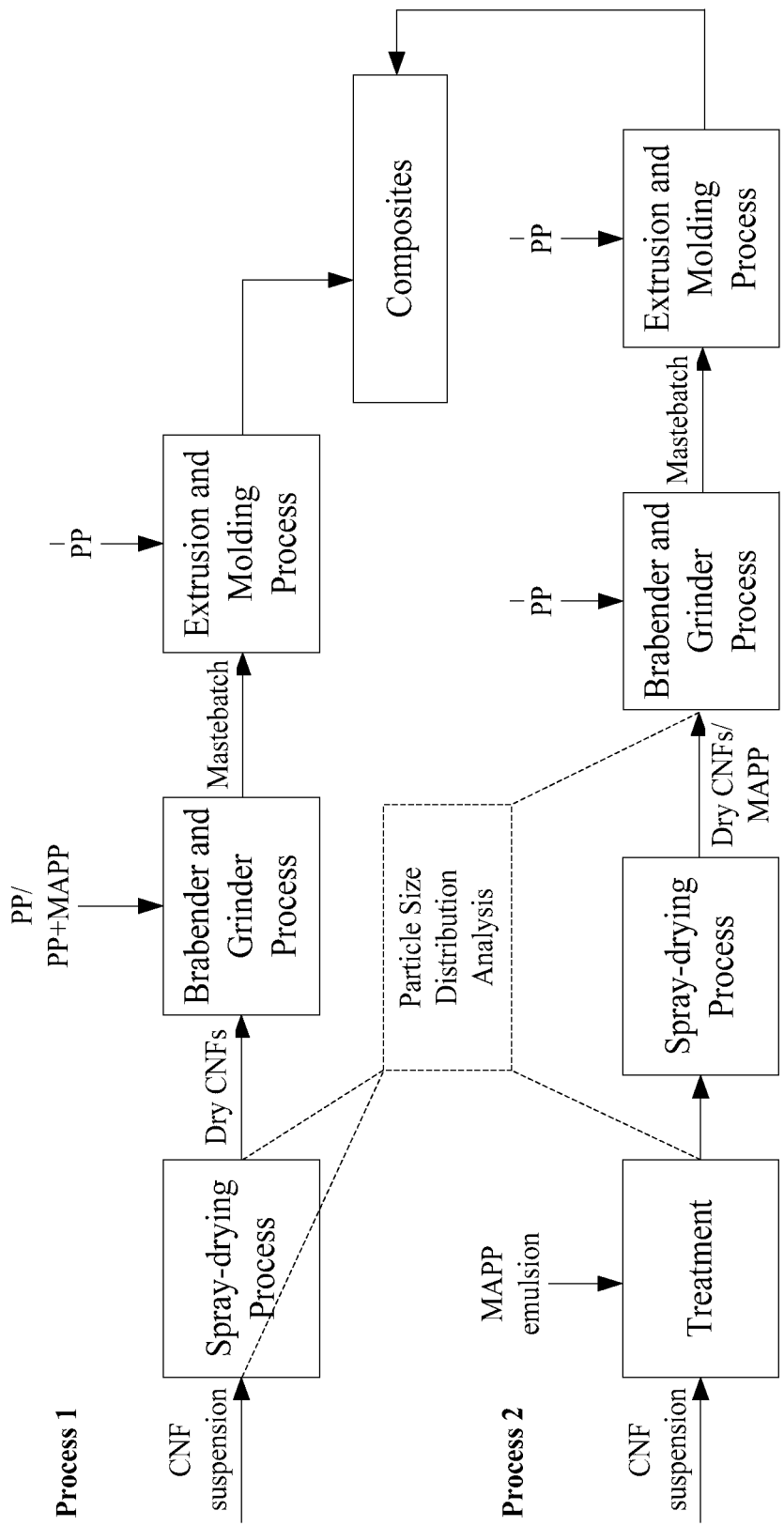
FIG. 1 shows a flow diagram depicting certain exemplary embodiments.

In this application, unless otherwise clear from context, (i) the term "a" may be understood to mean "at least one"; (ii) the term "or" may be understood to mean "and/or"; (iii) the terms "comprising" and "including" may be understood to encompass itemized components or steps whether presented by themselves or together with one or more additional components or steps; and (iv) the terms "about" and "approximately" may be understood to permit standard variation as would be understood by those of ordinary skill in the art; and (v) where ranges are provided, endpoints are included.

Approximately:

As used herein, the term "approximately" and "about" is intended to encompass normal statistical variation as would be understood by those of ordinary skill in the art. In certain embodiments, the term "approximately" or "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

Substantially:

As used herein, the term "substantially" refers to the qualitative condition of exhibiting total or near-total extent or degree of a characteristic or property of interest. One of ordinary skill in the art will understand that chemical phenomena rarely, if ever, go to completion and/or proceed to completeness or achieve or avoid an absolute result. The term "substantially" is therefore used herein to capture the potential lack of completeness inherent in many chemical phenomena.

DETAILED DESCRIPTION OF CERTAIN EMBODIMENTS

The present invention provides, among other things, composite materials with enhanced properties, and methods of making those materials. In some embodiments, provided composite materials comprise nanofibrils, a maleic-anhydride (MA) copolymer and a matrix polymer. According to various embodiments, provided methods and composite materials exhibit unexpectedly superior properties including improved impact resistance, tensile modulus of elasticity, tensile strength, and flexural modulus of elasticity, as compared to previously known composites.

In some embodiments, the present invention provides methods including the steps of providing cellulose nanofibrils, associating the cellulose nanofibrils with a maleic-anhydride (MA) copolymer to form a nanofibril-MA copolymer blend, preparing the nanofibril-MA copolymer blend for addition to a matrix polymer, and forming a composite by associating the nanofibril-MA copolymer blend with the matrix polymer, wherein the amount of cellulose nanofibrils in the composite is between 3% and 50% by weight of the composite. In some embodiments, the preparing step comprises drying the nanofibril-MA copolymer blend. In some embodiments, the drying is spray drying.

Cellulose Nanofibrils

In recent years, interest in composites reinforced by renewable materials, such as wood flour/cellulose fibers, has grown tremendously because of social requests for low environmental stress (biodegradable) materials, low-maintenance, and high-durability products. Cellulose, one of the basic structural components of wood fibers, is the most abundant polymer on earth and has great potential for the preparation of novel composite materials with thermoplastic resins. Compared to the conventional reinforcements such as glass fibers or inorganic fillers, cellulosic materials offer a series of advantages: lower density (1.5 g/cm$^3$), better recyclability and disposal, lower price, reduced abrasion to processing machinery, and carbon dioxide neutrality.

Cellulose is a high molecular weight linear syndiotactic homopolymer composed of D-anhydroglucopyranose units (AGU) which are linked together by β-(1→4)-glycosidic bonds. The natural affinity for self-adhesion of cellulose chains allows for formation of CNFs with crystalline and amorphous domains. These CNFs may form the basic aggregation units to form microfibrils or cellulose fibers such as pulp fibers. With the size decrease from bulk wood cells to nanofibrils, the elastic modulus of cellulose increases from about 10 GPa to 70 GPa or, in some cases, even higher (145 GPa). Compared with stainless steel, the strength-to-weight ratio of cellulose nanocrystals is reported to be eight times higher (see Ferguson W, Why wood pulp is world's new wonder material, 2012, *New Scientist,* 2878: 24; see also Cranston et al., Mechanical testing of thin film nanocellulose materials, 2012, www.tappi.org/Hide/Events/2012-Nanotechnology-Conference/Papers/12NANO05.aspx, Accessed 17 Jul. 2014).

In general cellulose nanofibrils, also referred to as nanocellulose, is a material comprising nano-sized fine fibers with a high aspect ratio. Cellulose nanofibrils (CNF) may be prepared in a number of different was and may exist in a number of different forms, including: (1) bacterial cellulose nanofibers, (2) cellulose nanofibers by electrospinning, (3) nanofibrillated cellulose (NFC), and (4) nanorods, cellulose whiskers, or cellulose nanocrystals (CNC). In some embodiments, a cellulose nanofibril may be a fiber or particle having any shape wherein at least one dimension (e.g., diameter, width, thickness, and/or length) of about 100 nanometers or less. In some embodiments, cellulose nanofibrils may have a diameter between 5 and 20 (e.g., about 5 to 15, about 5 to 10) nanometers, inclusive. In some embodiments, cellulose nanofibrils may have a length between about 10 and 5,000 (e.g., about 10 to 4,000, about 10 to 3,000, about 10 to 2,000, about 10 to 1,000, or about 10 to 500) nanometers, inclusive.

In some embodiments, cellulose nanofibrils may be pretreated before association with an MA-copolymer. In some embodiments, pretreatment may be an enzymatic pretreatment, chemical pretreatment, and/or a mechanical pretreatment. In some embodiments, enzymatic pretreatment is or comprises treatment with a cellulase (e.g., an A-, B-, C-, and/or D-type cellulase). In some embodiments, chemical pretreatment is or comprises 2,2,6,6-tetramethyl-1-piperidinyloxy (TEMPO)-mediated oxidation. In some embodiments, pretreatment may be or comprise the introduction of charged group to the nanofibrils (e.g., through carboxymethylation). In some embodiments, pretreatment may be or comprise acetylation of cellulose nanofibrils.

According to various embodiments, cellulose nanofibrils may be isolated from any cellulosic material. In some embodiments, cellulose nanofibrils are isolated from wood-based material, such as, for example, woodpulp (e.g., bleached Kraft pulp and/or bleached sulfite pulp). In some embodiments, cellulosic nanofibrils may be or comprise wood fibers, paper fibers, pulp fibers, rice-husk flour, flax, jute, sisal, microcrystalline cellulose (MCC), nanofibrillated cellulose (NFC), cellulose nanocrystals (CNCs). Among them, nanofibrillated cellulose and cellulose nanocrystals are generally considered the elementary fibrils of cellulose materials, e.g., cellulose nanofibrils (CNFs).

Maleic-Anhydride Copolymers

Maleic anhydride (MA) is an organic compound with a chemical formula of $C_2H_2(CO)_2O$ that is used in a variety of industrial applications, including in the formation of coatings and polymers. Any of a variety of MA copolymers may be used in accordance with various embodiments.

In some embodiments, a MA copolymer is a MA-olefin copolymer. In some embodiments, suitable MA-olefin copolymers are those that provide desirable properties to a particular provided composite material. Non-limiting examples of olefin copolymers that are suitable for use according to various embodiments include, but are not limited to ethylene; alpha olefins such as propylene, 1-butene, 1-pentene, 1-hexene, 1-heptene, 1-octene, 1-nonene, 1-decene and 1-dodecene; 2-butene; 2-pentene; 2-hexene; 2-octene; and combinations thereof.

Among the commodity plastics, polypropylene (PP) has been widely used because of its low price, light weight, good weathering ability, design flexibility, recyclability, and its attractive combination of good processability, mechanical properties, and chemical resistance. Commercially available PP is produced in a wide variety of types with the melt flow indices (MFI) ranging from 0.3 to more than 1000 g/10 min. Mass production of PP can be easily and economically achieved using well-established and reliable technologies. For some applications, reinforced by filler or fiber, PP can be used instead of other commodity thermoplastic and even engineering thermoplastics such as polycarbonate (PC) and acrylonitrile butadiene styrene (ABS). Reinforced PP composites can be produced with many different types of fillers using various processing techniques including injection molding, compression molding, blow molding, extrusion, and thermoforming. Recent developments in filled PP composites showed that high performance materials can be obtained by reinforcing PP using environmentally friendly reinforcements (natural wood fibers/cellulose fibers). In addition, cellulose nanofibrils have also been used in reinforcing PP. Adding CNFs in PP was observed to improve the mechanical property and thermostability of polypropylene (see Ljungberg et al., New nanocomposite materials reinforced with cellulose whiskers in atactic polypropylene: effect of surface and dispersion characteristics, 2005, *Biomacromolecules,* 6:2732-2739; see also Yang et al., Mechanical properties of cellulose nanofibril-filled polypropylene composites, 2011, *Wood Fiber Sci,* 43(2):143-152; Bahar et al., Thermal and mechanical properties of polypropylene nanocomposite materials reinforced with nano whiskers, 2012, *J Appl Polym Sci,* 125(4): 2882-2889). Accordingly, in various embodiments, an MA-copolymer is MA-polypropylene (see the Examples below for some such exemplary embodiments).

In some embodiments, a MA copolymer is a MA-polystyrene. Any suitable styrenic monomer can be used as one or more of the primary monomers according to various embodiments. Suitable styrenic monomers include those that provide the desirable properties to a particular provided composite materials. Non-limiting examples of suitable styrenic monomers include, but are not limited to styrene, p-methyl styrene, α-methyl styrene, tertiary butyl styrene, dimethyl styrene, nuclear brominated or chlorinated derivatives thereof and combinations thereof.

Associating

According to various embodiments, associating cellulose nanofibrils with MA-copolymers may occur in any of a variety of ways. In some embodiments, the association occurs under substantially dry conditions. In other words, in some embodiments, at the time of initiating the associating step, both the cellulose nanofibrils and MA-copolymer are substantially dry (e.g., contain less than 1% moisture content based on the oven dry weight of the material).

In some embodiments, the present invention provides methods of associating cellulose nanofibrils and MA-copolymers under non-dry conditions. In some embodiments, at least one of cellulose nanofibrils and MA-copolymers are in solution at the time the associating step is initiated. In some embodiments, at least one of cellulose nanofibrils and MA-copolymers comprise a portion of am emulsion at the time the associating step is initiated (e.g., an MA-copolymer is or comprises the dispersed phase of an emulsion).

The associating step may occur at any of a variety of temperatures. In some embodiments, the associating step may occur at a temperature between about 80° C. and 220° C. (e.g., about 80° C. and 200° C., about 80° C. to 150° C., about 80° C. to 100° C., about 100° C. to 200° C.), inclusive. In some embodiments, the associating step occurs at a temperature at or above 80° C. (e.g., 90° C., 100° C., 120° C., 140° C., 160° C., 180° C., 200° C., 220° C.). In some embodiments, the associating step occurs at a temperature at or below 220° C. (e.g., 200° C., 180° C., 160° C., 140° C., 120° C., 100° C., 90° C., 80° C.). In some embodiments, the temperature remains constant during the associating step. In some embodiments, the temperature increases during the associating step. In some embodiments, the temperature decreases during the associating step. In some embodiments, the temperature fluctuates during the associating step.

In accordance with various embodiments and particular applications, the length of time during which the associating step occurs may vary. In some embodiments the associating step is between about 1 minute and 60 minutes in duration (e.g., about 5 to 60 minutes, about 5 to 50 minutes, about 5 to 40 minutes, about 5 to 30 minutes, about 5 to 20 minutes, about 5 to 10 minutes). In some embodiments, the associating step occurs for at least one minute (e.g. at least 2, 3, 4, 5, 10, 15, 20, 25, 30, 35, 40, 45, 50, 55, or 60 minutes). In some embodiments, the associating step occurs for less than 60 minutes (e.g., less than 55, 50, 45, 40, 35, 30, 25, 20, 15, 10, 5, 4, 3, 2 minutes).

In some embodiments, associating refers to simple mixing of cellulose nanofibrils and MA-copolymers in a vessel or container. In some embodiments, associating refers to simple addition of both cellulose nanofibrils and MA-copolymer(s) to a vessel of container (e.g., associating occurs via simple diffusion or another passive process). In some embodiments associating involves active mixing. In some embodiments active mixing may be or comprise stirring, sonication, or other agitation.

In some embodiments, the associating step comprises combining cellulose nanofibrils in suspension with MA-copolymers (e.g., MAPP) in an emulsion during a spray-drying process. In some embodiments, the associating step comprises mixing dried cellulose nanofibrils with MA-copolymer pellets and a matrix polymer during an extrusion process.

Preparing Nanofibril-MA Copolymer Blend for Addition to a Matrix Polymer

As described herein, including in the Examples below, a variety of methods of preparing a nanofibril-MA copolymer blend for addition to a matrix polymer are contemplated as within the scope of the invention. In some embodiments, preparing a nanofibril MA-copolymer blend includes drying the nanofibril MA-copolymer blend. Exemplary, non-limiting methods of drying cellulose nanofibrils include those described in U.S. Pat. No. 8,372,320, issued on Feb. 12, 2013, the disclosure of which is hereby incorporated by reference in its entirety.

In some embodiments, preparing may be or comprise one or more of the following steps: drying the nanofibril MA-copolymer blend, cooling the dried nanofibril MA-copolymer blend, and granulating the dried nanofibril MA-copolymer blend to form a nanofibril MA-copolymer masterbatch.

In some embodiments, drying may be or comprise spray drying. As used herein, the phrase "spray drying" is defined as a processing method to convert a suspension, solution, or emulsion into a solid powder in one single process step. Spray drying involves evaporation of moisture from an atomized feed or spray of the suspension by mixing the spray and a drying medium. The drying medium is typically air or nitrogen.

In some embodiments, cooling may be or comprise removing a nanofibril MA-copolymer blend from a heat source (e.g., air cooling). In some embodiments, cooling may be or comprise active cooling (e.g., refrigeration and/or freezing).

In some embodiments, granulating may be or comprise grinding, ablating, and/or another form of converting a mass of material into smaller component pieces of the material. In some embodiments, granulating may be or comprise pelletizing. As used herein, the term "pelletizing" or "pelletized" refers to compressing or molding a material into the shape of a pellet. Pellets may be of any application- and/or material-appropriate shape and/or size.

In some embodiments, the result of the associating and/or preparing step may be or comprise a masterbatch of dry or substantially dry nanofibril MA-copolymer blend (e.g., as dry or substantially dry pellets, granules or other industrially useful form).

Forming a Composite Material

The specific method used to form a particular provided composite material may vary according to the desired mechanical, flexural, or other properties and may occur via any appropriate methods. By way of non-limiting example, two methods are generally used to produce polymer nanocomposites based on different polymer matrices. The first, solution casting, is the method typically used in solvent-based systems including aqueous dispersed polymers, i.e. latexes and organic solvent-based systems. The second nanocomposite manufacturing method generally used is the direct compounding of polymer melts and nanoreinforcements. Melt processing is generally considered more economical, more flexible for formulation, and involves compounding and fabrication facilities commonly used in commercial practice. CNFs/PP nanocomposite manufacturing has been conducted using the melting process (see Yang and Gardner 2011). However, the present invention provides methods of directly adding the CNF suspension to the polymer melts and forming a composite material with desirable/enhanced properties. This is surprising, at least in part, because addition of fillers and/or additives, such as nanofibrils, ordinarily leads to one of the major problems within the formation of composite materials, agglomeration, which complicates the mixing process, and causes serious CNF agglomeration during the mixing process. Accordingly, in some embodiments, compounding CNFs in a dry form with polymer melts through the extrusion process is desirable. Drying CNFs while maintaining their nano-scale dimensions has been studied in detail and dry forms of CNFs can be produced by, for example, the spray-drying method developed by Dr. Gardner's group at the University of Maine (see Peng et al., Drying cellulose nanofibrils: in search of a suitable method, 2012, *Cellulose*, 19(1): 91-102; see also Peng et al., Spray-drying cellulose nanofibrils: effect of drying process parameters on particle morphology and size distribution, 2012, *Wood and Fiber Sci*, 44(4): 1-14).

In addition to agglomeration issues, another significant challenge in developing CNF-reinforced PP nanocomposites is associated with surface properties of the dried CNFs. The incompatibility between the hydrophilic cellulose fibers and the hydrophobic polypropylene was observed to seriously degrade the mechanical properties of the composites and is thought to be due, at least in part, to the high density of hydroxyl groups on the surface of the CNFs. In addition, the hydrogen bonds between the hydroxyl groups allow for undesired adhesion between cellulose fibers. At nano-scale dimensions, cellulose fibrils can interact and agglomerate easily when in close proximity to each other.

To avoid these drawbacks, in some embodiments, the cellulose fiber can be subjected to specific surface modifications to: 1) decrease the agglomeration, 2) provide an efficient hydrophobic barrier, and 3) minimize their interfacial energy with the non-polar polymer matrix and thus generate optimum adhesion. Further improvement in this interfacial strength, which is a basic requirement for the mechanical performance of some embodiments, is attained by chain entanglement between the matrix macromolecules and long chains appended to the fiber surface or, in some embodiments, by the establishment of a continuity of covalent bonds at the interface between the two components of the composite. The cellulose chemical moieties exploited for this purpose are its hydroxyl functional groups, which have been the source of well-known reactions used to prepare a wide array of cellulose derivatives, including esters, ethers, etc. According to various embodiments, such modifications are limited to the superficial —OH groups to preserve the integrity of the fibers and thus their mechanical strength.

Physical treatments and chemical modifications have been used to treat the surface of cellulose fibers with the specific purpose of their subsequent incorporation into polymer matrices. The reported physical treatment methods include plasma, corona, laser, vacuum-ultraviolet, and γ-ray treatments (see Belgacem and Gandini, The surface modification of cellulose fibres for use as reinforcing elements in composite material, 2005, *Composite Interfaces,* 12(1-2): 41-75). Chemical treatments using coupling agents are commonly used to change the surface nature of cellulose, in which a compound (coupling agent) is used to treat the substrate forming a bridge of chemical bonds between fiber and matrix. Generally, coupling agents facilitate the optimum stress transfer at the interface between fiber and matrix. Various chemical treatments have been reported on cellulose surface, such as silane treatment, esterification, alkaline treatment, maleic anhydride-grafted polypropylene (MAPP) treatment, and others. In some embodiments, coupling agent treatment using maleic anhydride-grafted polypropylene (MAPP) has been found to be the most efficient in improving the mechanical properties of cellulose composite materials (see Examples below).

Improved Properties

As described herein, provided methods allow for the production of composite materials with enhanced properties. In some embodiments, a provided composite is characterized as having an impact resistance that is higher than that of a composite consisting of only the matrix polymer and cellulose nanofibrils. In some embodiments, provided compositions are characterized as having an impact resistance at least 5% (e.g, 6%, 7%, 8%, 9%, 10%, 15%, 20%, 25%, 30%, 35%, 40%, 45%, or 50%) higher than that of a composite consisting of only the matrix polymer and cellulose nanofibrils.

In some embodiments, a provided composite is characterized as having a tensile modulus of elasticity that is higher than that of a composite consisting of only the matrix polymer and cellulose nanofibrils. In some embodiments, provided compositions are characterized as having a tensile modulus of elasticity at least 5% (e.g., 6%, 7%, 8%, 9%, 10%, 15%, 20%, 25%, 30%, 35%, 40%, 45%, or 50%) higher than that of a composite consisting of only the matrix polymer and cellulose nanofibrils. In some embodiments, provided composite materials may exhibit increased tensile modulus elasticity as compared to a composite consisting of only the matrix polymer and cellulose nanofibrils while maintaining a level of impact resistance at or above the impact resistance exhibited by the composite consisting of only the matrix polymer and cellulose nanofibrils.

In some embodiments, a provided composite is characterized as having a tensile strength that is higher than that of a composite consisting of only the matrix polymer and cellulose nanofibrils. In some embodiments, provided compositions are characterized as having a tensile strength at least 5% (e.g., 6%, 7%, 8%, 9%, 10%, 15%, 20%, 25%, 30%, 35%, 40%, 45%, or 50%) higher than that of a composite consisting of only the matrix polymer and cellulose nanofibrils. In some embodiments, provided composite materials may exhibit increased tensile strength as compared to a composite consisting of only the matrix polymer and cellulose nanofibrils while maintaining a level of impact resistance at or above the impact resistance exhibited by the composite consisting of only the matrix polymer and cellulose nanofibrils.

In some embodiments, a provided composite is characterized as having a flexural modulus of elasticity that is higher than that of a composite consisting of only the matrix polymer and cellulose nanofibrils. In some embodiments, provided compositions are characterized as having a flexural modulus of elasticity at least 5% (e.g., 6%, 7%, 8%, 9%, 10%, 15%, 20%, 25%, 30%, 35%, 40%, 45%, or 50%) higher than that of a composite consisting of only the matrix polymer and cellulose nanofibrils. In some embodiments, provided composite materials may exhibit increased flexural modulus elasticity as compared to a composite consisting of only the matrix polymer and cellulose nanofibrils while maintaining a level of impact resistance at or above the impact resistance exhibited by the composite consisting of only the matrix polymer and cellulose nanofibrils.

In some embodiments, a provided composite is characterized as having a flexural strength that is higher than that of a composite consisting of only the matrix polymer and cellulose nanofibrils. In some embodiments, provided compositions are characterized as having a flexural strength at least 5% (e.g., 6%, 7%, 8%, 9%, 10%, 15%, 20%, 25%, 30%, 35%, 40%, 45%, or 50%) higher than that of a composite consisting of only the matrix polymer and cellulose nanofibrils. In some embodiments, provided composite materials may exhibit increased flexural strength as compared to a composite consisting of only the matrix polymer and cellulose nanofibrils while maintaining a level of impact resistance at or above the impact resistance exhibited by the composite consisting of only the matrix polymer and cellulose nanofibrils.

EXAMPLES

Example 1

This Example shows, among other things, that provided methods and compositions are able to achieve reinforced polypropylene nanocomposite materials with surprisingly advantageous properties.

Unless otherwise specified, the processes used in this Example were as follows:

Materials

The polypropylene (PP) used as the thermoplastic matrix polymer in this Example was supplied by INEOS Olefins & Polymers USA (League City, Tex.) and is marketed under the commercial name of H05A-00 polypropylene homopolymer. The density of the PP matrix was 0.89-0.93 g/cm$^3$. The melt flow index for this material was 4.70 g/10 min under the temperature of 230° C. at the load of 2.16 kg.

A cellulose nanofibril suspension at 3 wt. % provided by the Chemical Engineering Department at the University of Maine was used as the raw material. The CNF suspension was stored in a plastic container at room temperature before drying.

The coupling agents of nonionic polypropylene emulsion (MAPP emulsion of FGLASS™ X35) and the maleic anhydride modified homopolymer polypropylene (MAPP) pellets (Polybond 3200) were provided by Michelman, Inc. (Cincinnati, Ohio) and Chemtura Corporation (Lawrenceville, Ga.). In the polypropylene emulsion (FGLASS™ X35), the main non-volatile was maleated polypropylene with the solid content of 34-36 wt. %. The specific gravity for the emulsion was 0.96-0.98 g/cm$^3$. At 22° C., the Brookfield viscosity of the emulsion with spindle number 2 rotating at 60 RPM was about 200 cps. The maleic anhydride level in Polybond 3200 pellets was about 1.0 wt. %. The melting point and density of Polybond 3200 was 157° C. and 0.91 g/cm$^3$. The melt flow at 190° C. with the load of 2.16 kg was 115 g/10 minute.

Experimental Design and Sample Preparation

A thermal compounding process was used to manufacture the CNFs reinforced PP nanocomposites. The composite formulations are shown in Table 1. CNFs in dry form were obtained through a spray-drying process first. Then, the concept of "masterbatching" was employed to disperse the CNFs into the polymer matrix (PP or MAPP). "Masterbatching" is typically used in the plastic compounding field for coloring plastics or imparting other properties to plastics. In this Example, masterbatch including CNFs, MAPP, and/or PP was produced first and then the ground pellets from masterbatch was redispersed into the PP matrix using extrusion process to produce the composites.

TABLE 1

Composites formulation (wt. %)

| Composite | PP | CNFs (dry) | MAPP in pellets | MAPP in emulsion |
|---|---|---|---|---|
| PP | 100 | 0 | 0 | 0 |
| PP + MAPP | 98 | 0 | 2 | 0 |
| PP + CNF | 94 | 6 | 0 | 0 |
| PP + MAPP + CNF | 92 | 6 | 2 | 0 |
| PP + MAPP_CNF | 92 | 6 | 0 | 2 |

For generating masterbatches for each sample shown in Table 1, the weight ratio of CNFs to the polymers (PP or PP plus MAPP) was maintained at 81 to 200. Based on the two different coupling agent treatments, two different processes were designed to generate the masterbatch and composites (FIG. 1). In process I, CNF suspension was dried first and then the dried CNFs were mixed with PP pellets or PP plus MAPP pellets to produce the masterbatches of PP+CNF and PP+MAPP+CNF. The final corresponding composites were manufactured using an extrusion process with the formulations shown in Table 1. For the MAPP emulsion treated CNFs, the process II in FIG. 1 was employed. The MAPP emulsion treated CNF suspension was dried and then the dried mixture of CNFs and MAPP was compounded with PP to generate the masterbatch of PP+CNF_MAPP. The final composite was manufactured using the same extrusion process. The pure PP and blends of PP and 2 wt. % MAPP pellets were also processed using the same extrusion procedures.

Drying of CNF suspension (untreated and treated with MAPP emulsion) was conducted through a laboratory scale spray dryer of Buchi B-290 (Buchi, Switzerland). The spray-drying process was performed as previously described (see both Peng et al., 2012, referenced above). In this Example, the CNF suspension at 1 wt. % was dried at the inlet temperature of 200° C., spray gas flow of 601 l/h, pump rate of 48 ml/min, and drying gas flow rate of approximate 35 m$^3$/h. For the emulsion treatment on the CNF suspension, MAPP emulsion was first added into the 1 wt. % CNF suspension with the weight ratio of CNF to MAPP of 3:1 and then mixed using a Speed Mixer® (Flack Tek Inc., US) for 2 minutes at 2000 rpm, followed by the ultrasonic treatment at 80° C. for 1 h. The treated suspension was then dried using the same spray-drying process.

A thermal compounding process used to produce the masterbatch materials, and was performed on a C. W. Brabender Prep Mixer® (C. W. Brabender Instruments, INC., South Hackensack, N.J.) by controlling the temperature of the mixing bowl which has a capacity of 200 grams. The polymer pellets (PP or PP plus MAPP) were initially melted at 200° C. and then compounded with the corresponding weight of CNFs or treated CNFs in the Brabender for about 8-10 minutes at 200° C. with mixing bowl rotating at the speed of 60 rpm, followed by grinding. Prior to compounding, the PP pellets, MAPP pellets, CNFs (treated and untreated) were dried in an oven at 105° C. for 2 h. The ground masterbatch pellets were mixed with PP pellets and then were extruded at 60 rpm through the C. W. Brabender 20 mm Clamshell Segmented Twin Screw Extruder attached to the Intelli-Torque Plastic-Corder drive system (C. W. Brabender Instruments, INC., South Hackensack, N.J.). The pellets were fed into the first zone of the extruder through the feed hopper at about 70 g/min. The screw configuration of the system was Stand-alone TSE20/40D. The five heating zones were all set up at 200° C. The composite extrudate was passed through a two-nozzle die with the diameter of each nozzle 2.7 mm. The die temperature was also maintained at 200° C. The extrudate, in its melt state, was cooled and solidified directly in an air-cooling system while being pulled with a 2200 Series End Drive Conveyor from DORNER MFG. Corp. (Hartland, Wis.). Then the solidified extrudate was pelletized through a pelletizer designed for the laboratory extrusion runs from C. W. Brabender Instruments, INC. The pelletized composite material was then injection molded into shapes specified in ASTM D638 and D790 for tensile, flexural and Izod impact testing. An injection molder Model #50 "Minijector" with a ram pressure of 2500 psi at 200° C. was used to produce samples. The molded samples were kept in the mold for 10 seconds to cool. The samples were then put into plastic containers and stored in desiccators to maintain dryness.

Particle Size Analysis

Particle size distributions of CNFs were determined using a Mastersizer 2000 particle size analyzer (Malvern Instruments, Malvern, UK), for dry samples analysis using the Sirocco 2000 dry dispersion unit and for suspension samples analysis using the Hydro 2000S unit. The operation principle of this equipment is based on the technique of laser diffraction, which takes advantage of the phenomenon that particles scatter light in all directions with an intensity angular pattern that is dependent on particle size. Larger particles will scatter at small angles and smaller particles scatter at wide angles. With the detection of the intensity pattern, the particle size can be determined using Mie theory (Mie 1908). For characterizing the dry CNFs, the material under investigation was first placed into the vibratory tray of the Sirocco dry dispersion unit. A steady flow of sample into the dispersion system and an optimum sample concentration through the measurement cell must then be obtained by adjusting the air pressure and feed rate. In this study, all the measurements were taken at 4-bar of air pressure and 20% of feeder capacity. For analyzing the particle size distribution of CNFs in suspension, a small amount of CNF suspension (treated and untreated) was prepared using the Speed Mixer and added into the dispersion cell and then was pumped to the measurement zone. The agitation produced by the pump and the sonication applied may be helpful for maintaining a stable dispersion of CNFs in water. The pump rate and sonication used in this study is 2100 rpm and 20% of the sonication capacity. Five replicates were performed for each sample. The average particle size distributions were reported.

Melt Flow Index

The melt flow index (MFI), as used herein, is defined as the mass of a polymer melt in grams extruded in ten minutes through a standard capillary of a specific diameter and length in a melt floe indexer when a fixed pressure is applied to the melt at a prescribed temperature, as specified by ASTM D1238-10. Melt flow index of all the composite samples were measured using the Dynisco Melt Flow Indexer Model 4004 (Morgantown, Pa.). The standard die used inside the barrel of Dynisco Melt Flow Indexer had an orifice diameter of 2.095 mm and length of 8 mm. The instrument was first heated to the test temperature of 230° C. and maintained for at least 15 minutes prior to charging the composite samples. A measured quantity of material (ranging from 3-5 g) in pellet form after extrusion was charged to the barrel and packed down. The piston was then inserted into the barrel and the test weight of 2.16 kg was added on top of the piston after a 2-minute "melt" period, commencing the extrusion. The extrudate cut-off time-interval was set up as one minute according to ASTM D 1238 for the composite samples. Cutting of extrudates was completed manually. Extrudates were discarded if there were visible bubbles. Five extrudates were collected for each sample and weighed to the nearest 1 mg. The average value was calculated and then was converted to the standard melt flow rate number with the units of g/10 minute. Tests were considered valid if the difference between the average and maximum and minimum values was not greater than 15% of the average value.

Tensile Test

Tensile tests were performed to examine static tensile strength and modulus of elasticity (MOE) of the composite samples according to ASTM D638-10 standard and under a displacement control loading with the speed of loading at five mm/min (nominal strain rate at start of test=0.1 $min^{-1}$). An extensometer was employed to determine elongation of the samples. Tests were performed in an environmentally conditioned room at 23±2° C. and 50±5% RH. A 10000-N load cell attached to a servo hydraulic testing machine (Instron 5966) was used to collect stress-strain data. At least five samples were tested for each sample and then average and standard deviation were calculated.

Flexural Test

Flexural tests were performed to examine static 3-point bending strength and modulus of elasticity of the composite samples according to ASTM standard D790-10 and under a displacement control of loading (loading rate=1.27 mm/min). The outer fiber strain rate is 0.01 $min^{-1}$. Tests were performed in an environmentally conditioned room at 23±2° C. and 50±5% RH. The applied spans were 50.8 mm long for a length/depth ratio of 16. A 266.9-N load cell attached to servo hydraulic testing machine (Instron 8872) was used to collect stress-strain data. Static flexural loads were applied to five replicate for each sample and then the average and standard deviation were calculated.

Izod Impact Test

Izod impact tests were performed on composite samples according to ASTM D256-10 using a Ceast pendulum impact tester (Model Resil 50B). Notching was produced on the impact specimens using a Ceast notch cutting machine. Tests were performed in an environmentally conditioned room at 23±2° C. and 50±5% RH. The test was applied to 10 replicate for each sample. The average value of impact resistance in $kJ/m^2$ and standard deviation were reported.

Scanning Electron Microscopy

The morphologies of the spray-dried CNFs and the fractured composite samples were directly studied by SEM using the Hitachi Tabletop Microscope SEM ™ 3000 (Hitachi High-Technologies Corporation, Tokyo, Japan) at an accelerating voltage of 15 kV. Micrographs at various magnifications were obtained.

Results

Figure 2:
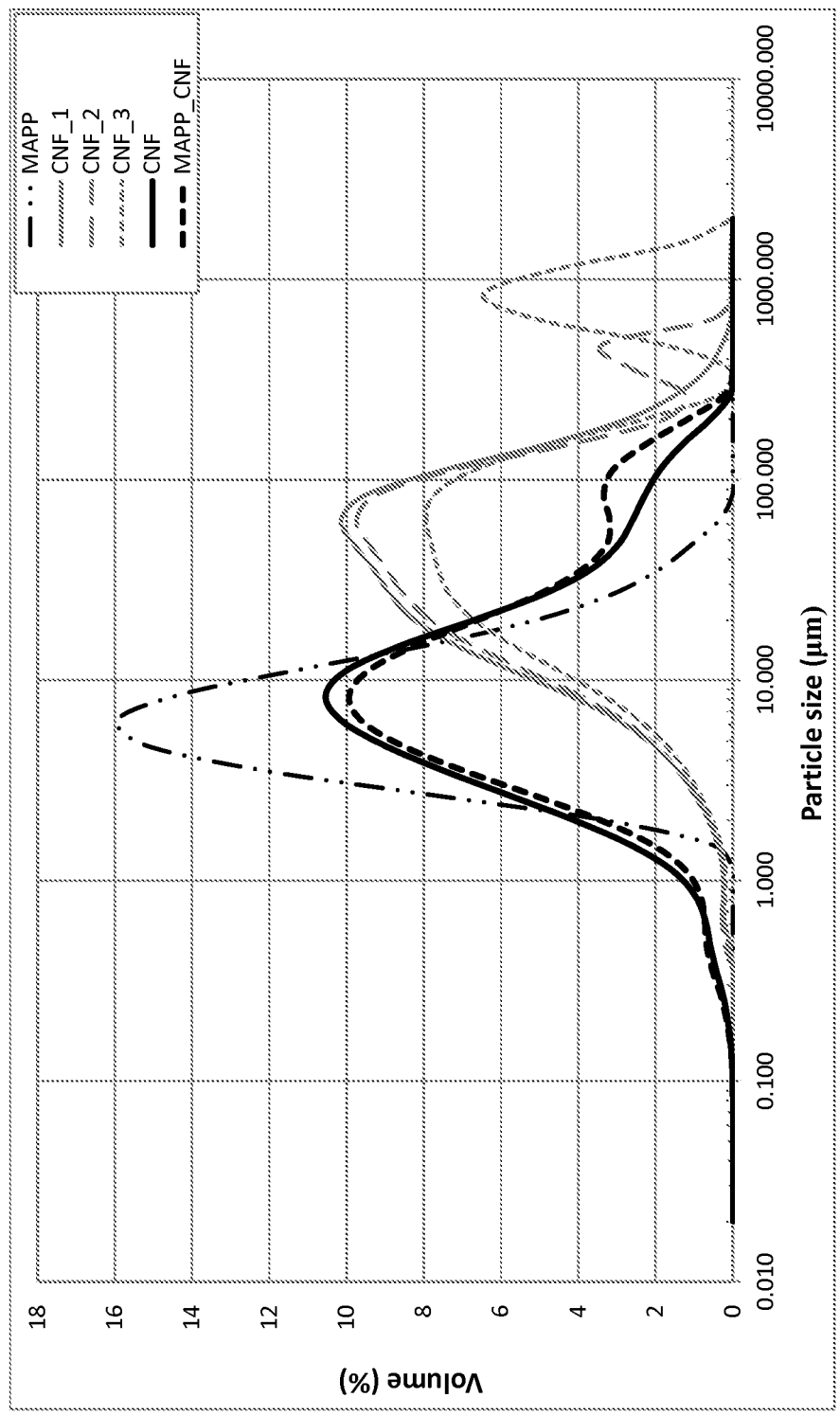
FIG. 2 shows a graph of exemplary particle size distributions (PSD) of cellulose nanofibrils (CNFs) in suspension or dry form. CNF represents the PSD of spray-dried CNF. MAPP_CNF represents the PSD of spray-dried CNFs treated by MAPP emulsion. CNF_1 represents the original PSD of CNFs in suspension. CNF_2 represents the PSD of the mixture of CNFs and MAPP emulsion before ultrasonic treatment. CNF_3 represents the PSD of the mixture of CNFs and MAPP emulsion after ultrasonic treatment. MAPP indicates the PSD of solid content in MAPP emulsion.

The particle size distributions of CNFs in suspension (grey lines) measured by laser diffraction are shown in FIG. 2. In laser diffraction, the diameters of spherical materials which generate the same intensity patterns of the measured samples, are characterized as the particle sizes of the interested materials (spherical equivalent diameter). The results of particle size distribution obtained by laser diffraction are reported on a volume basis. A single peak with particle size from 0.6 to 2000 μm was observed for CNF in suspension (CNF_1 in FIG. 2). After about 843.4 μm, there are only about 0.1% by volume of the CNFs in suspension which is not observable in the shown particle size distribution curve in FIG. 2. The standard percentile readings D (n, 0.1), D (n, 0.5), and D (n, 0.9) of particle sizes derived from the statistics of the distribution are 8.9, 43.4, and 151.6 μm, e. g., 50% of the CNFs by volume in suspension is smaller than 43.4 μm. Adding MAPP emulsion with solid content (maleated polypropylene) particle sizes from 1.5 to 84.3 μm (MAPP in FIG. 2) in the CNF suspension changed the particle size distribution of the CNFs. After the mixing process with a Speed Mixer, a second peak of about 7.7% by volume with particle sizes from about 266.7 to 843.4 μm was observed on the particle size distribution curve (CNF_2 in FIG. 2). With the ultrasonic treatment at 80° C. for an hour, the particle size distribution of treated CNFs (CNF_3) in suspension changed again. The second peak observed before the ultrasonic treatment shifts to a larger size area ranging from 355.7 to 2000 μm. The volume of the particles in this size range also increased to about 19.4%. The larger size of CNFs detected during the laser diffraction measurement after the MAPP emulsion treatment may indicate that grafting of MAPP to the CNFs occurred during the mixing process and ultrasonic treatment at 80° C. promoted the reaction between MAPP and CNFs. In the study of Qiu et al. (Interfacial interactions of a novel mechanochemical composite of cellulose with maleated polypropylene, 2004, *J. Appl. Polym. Sci,* 94:1326-1335), formation of ester bonds between cellulose and MAPP was observed during ball-milling crystalline cellulose and MAPP. Without wishing to be held to a particular theory, another possible major contribution to the larger size of CNFs may be related to the bridges built among CNFs by the MAPP molecules, resulting in connected CNFs in the particle sizes twofold or above.

The connection formation of CNFs is similar to the process of forming micelles in suspension. Polypropylene part in MAPP molecules form the core with the CNFS parts as the tails contacting with surrounding water. The decreased proportion of particles in the smaller sizes appears to validate this theory.

After spray-drying, the particle size distributions of dried CNFs (CNF in FIG. 2) characterized using the same technique are shown as black lines in FIG. 2. The particle sizes of dried CNFs ranges from 0.1 to 266.7 µm with the standard percentile readings D (n, 0.1), D (n, 0.5), and D (n, 0.9) of 2.4, 10.0, and 55.4 µm, respectively. Compared to the CNFs in suspension, the particle sizes of dried CNFs are significantly smaller and the distribution is narrower. Exclusion of larger size of CNFs from suspension was observed in the spray-drying process. A lot of CNFs were deposited on the drying chamber wall. The smallest particle decreased from 0.6 µm in suspension to 0.1 µm in dry form. The drying process may fold the longer soft CNFs in suspension, forming smaller or different shape particles which generate smaller size in the laser diffraction measurement. With the same drying process, the CNFs treated with MAPP emulsion (MAPP_CNF in FIG. 2) after drying showed similar particle size distribution with pristine CNFs except the greater proportion of relative large particle size ranging from 84.3 to 266.7 µm. As a result, the standard percentile readings for D (n, 0.1) and D (n, 0.5) are slightly greater than that of the pristine CNFs with values of 2.7 and 11.1 µm while the value of D (n, 0.9) shift to a greater number of 84.8 µm. The differences of the three readings demonstrate the effect of the MAPP emulsion treatment. During the drying process, the larger particles of the treated CNFs which were possibly caused by grafting of MAPP molecules were eliminated, resulting in the possibility of less content of MAPP on the dried CNFs than the designed value.

Figure 3:
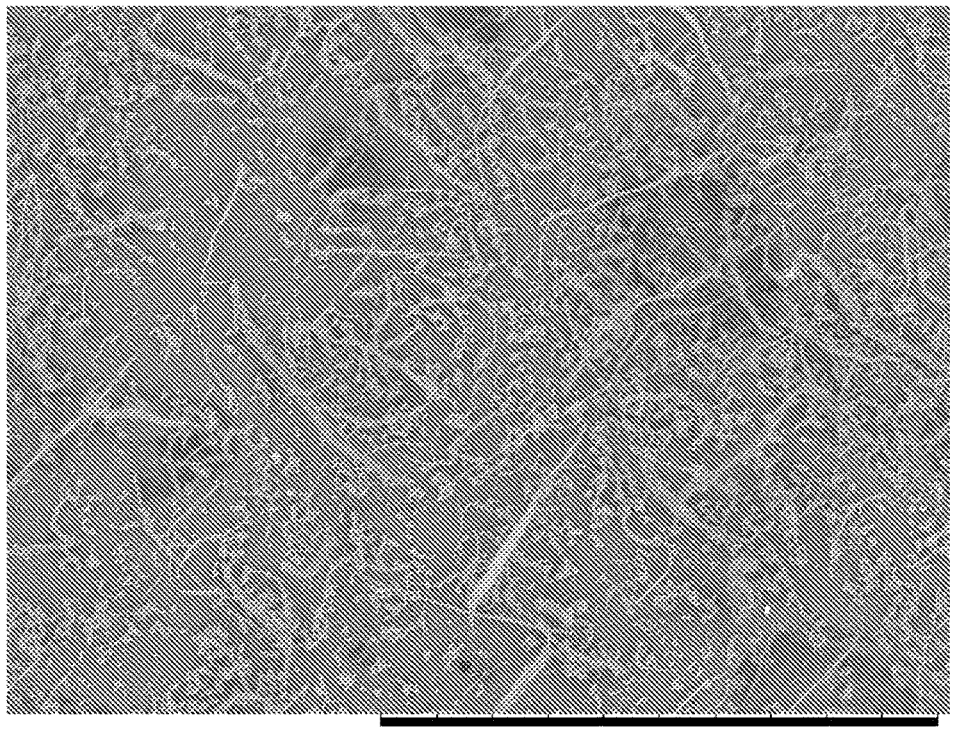
FIG. 3A-B shows exemplary SEM micrograms of spray-dried CNFs: panel (A)×200 and panel (B)×1000.
Figure 3:
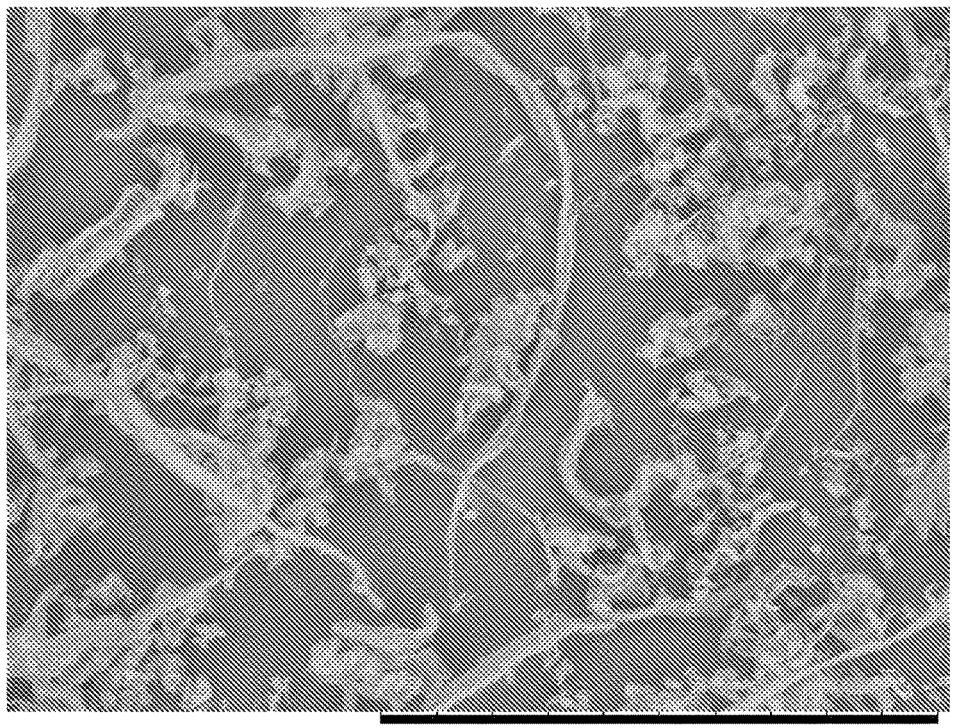

The SEM micrograms of the dried CNFs are shown in FIG. 3. Several different morphologies of particles are observed: fibrous materials with different diameters and length, ribbon-like (or platelet) materials with different thickness, width, or length, and irregular shape of materials with different degree of agglomeration. Detailed information regarding the morphology formation of spray-dried CNFs may be found in a previous paper (see Peng et al. 2012). The fibrous CNF diameters range from about 0.1 to several µm with the length up to about 500 µm. The ribbon-like materials are generally several µm in width, submicron meters in thickness, and tens of micron meters in length. These two types of CNFs are generally formed during the CNF manufacturing process. After spray-drying, they almost inherited their original shape and dimensions. The agglomerated particles are mostly formed during the spray-drying process by the smaller size CNFs and vary in a range of sizes and shapes. The particle size distribution of CNFs characterized by laser diffraction showed the spherical equivalent diameters which is good for comparison between different samples. For the actual particle sizes, characterization combining these two techniques gives more reasonable results. The SEM micrograms of spray-dried CNFs treated using MAPP emulsion (not shown) showed similar morphologies with pristine CNFs. The difference observed in the particle size distribution of FIG. 2 between treated and untreated CNFs cannot be detected in the SEM micrograms.

Melt Flow Index

The melt flow indices of all the composites were measured according to the ASTM D1238-10. The melt flow index data and the standard deviations are shown in Table 2. Melt flow index (MFI) is a measure of flow inversely related to melt viscosity. The measurement of MFI is a simple yet very useful method to estimate the chain mobility of polymer composites. As seen in Table 2, melt flow index of PP after the extrusion process is 7.2 g/10 min. After adding 2 wt. % MAPP, the MFI of the mixture increased to 9.3 g/10 min, which is the expectation of adding lower viscosity of MAPP pellet. With the addition of 6 wt. % of spray-dried CNFs into PP, the mixture showed a higher MFI (lower viscosity) compared with Generally, the addition of natural fiber to polymer composites is known to restrict molecular motion in the matrix and cause the lowering of MFI values (see Jam and Behravesh, Flow behavior of HDPE-fine wood particle composites, 2007, J. Thermoplastic Composite Materials, 20(5): 439-451; see also Shumigin et al., Rheological and mechanical properties of poly(lactic) acid/cellulose composites, 2011, Materials Sci., 17(1): 32-37). However, an increase of MFI value was observed in this Example, which may indicate a better molecular motion between polymer chains in PP/CNFs system. Without wishing to be held to a particular theory, one of the possibilities is the low loading level of CNFs used in the study. Secondly, a phase separation between CNFs and PP may be formed during the mixing process using an extruder because of the incompatibility between hydrophilic CNFs and hydrophobic PP. At the same time, the small size of CNFs (high surface area) may form significant amount of separate surfaces. Air might be trapped in the space between CNFs and PP, facilitating the motion of polymer molecules and CNFs. The high measurement temperature of 230° C. and the retention melting time (2 minutes) inside of the melt flow indexer barrel may also contribute to the formation of volatile between CNFs and PP because of the decomposition or dehydration of CNFs. Additionally, separation of PP molecules by CNFs decreased the entanglement density of PP molecules, resulting in higher MFI value. Utilization of MAPP in the PP/CNFs system decreased the MFI value (Table 2). Cross-linking between CNFs and PP may be established, decreasing the amount of separation surfaces. Simultaneously, the stiffer CNFs limit the motion of PP molecules, lowering the MFI values. The modification on PP/CNFs system using MAPP pellets showed slightly lower MFI compared to the PP reinforced by MAPP emulsion treated CNFs, which indicates that MAPP pellet treatment is more efficient in building the connections between CNFs and PP than the MAPP emulsion treatment in this study.

TABLE 2

The melt flow index and tensile strain at maximum load.

| Composite | Abbreviation | Melt flow index (g/10 min) | Tensile strain at maximum load (%) |
| --- | --- | --- | --- |
| Pure Polyproylene | PP | 7.2 ± 0.2$^a$ | 9.2 ± 0.3 [C]$^a$ |
| 98 wt % PP + 2 wt % MA-copolymer in dry form | PP + MAPP | 9.3 ± 0.9 | 9.2 ± 0.2 [C] |
| 96 wt % PP + 4 wt % spray dried CNF | PP + CNF | 8.7 ± 0.4 | 6.4 ± 0.2 [B] |
| 92 wt % PP + 8 wt % CNF treated with MA-copolymer emulsion | PP + MAPP_CNF | 7.8 ± 0.4 | 6.1 ± 0.3 [A] |

TABLE 2-continued

The melt flow index and tensile strain at maximum load.

| Composite | Abbreviation | Melt flow index (g/10 min) | Tensile strain at maximum load (%) |
|---|---|---|---|
| 92 wt % PP + 6 wt % spray dried CNF + 2 wt % MA-copolymer in dry form | PP + MAPP + CNF | 7.4 ± 0.4 | 6.7 ± 0.5 [B] |

$^a$The letter A, B, and C represent the significant levels in statistical analysis. The values with different letters are significantly different from one another (i.e., group with "A" is significantly different from groups with "B", "C", and "D").

Mechanical Properties and Fracture Surface Morphologies

Figure 4:
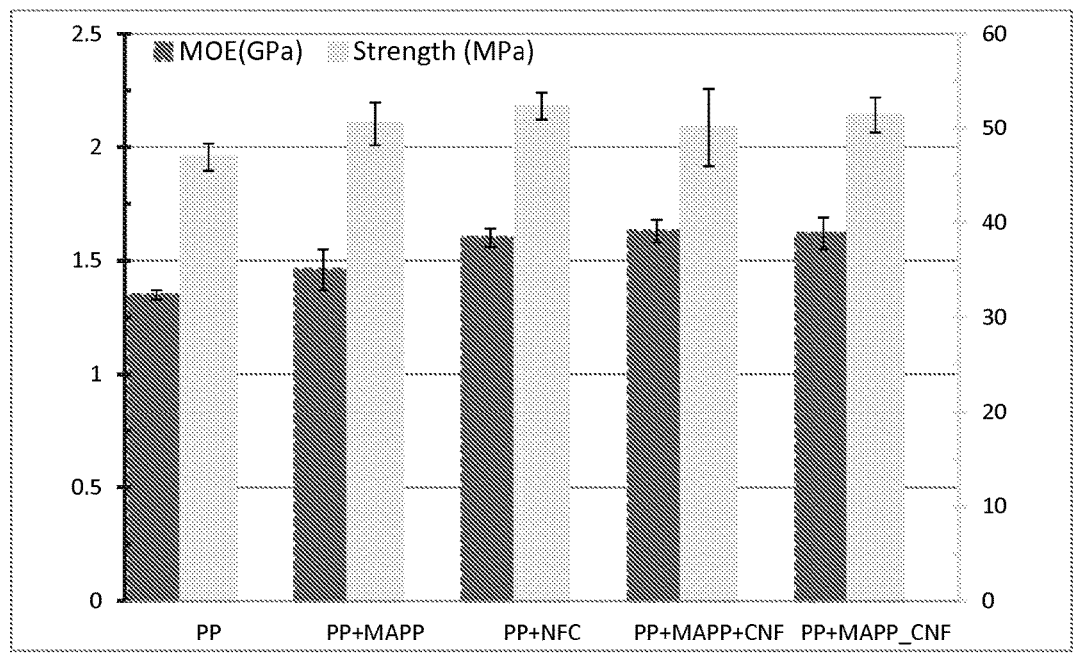
FIG. 4 shows an exemplary graph of the modulus of elasticity and tensile strength of certain embodiments as tested according to ASTM D 638-10.

Tensile tests on all the composites were conducted according to ASTM D 638-10. The tensile testing results for all the composites are shown in FIG. 4 and Table 3, including tensile modulus of elasticity (MOE) and tensile strength. The statistical analyses on the tensile MOE and tensile strength of the different composites were performed at a 0.05 significance level. The results are shown in Table 3 with brackets. The values with different letters (A, B, C, and D) are significantly different from one another (i.e., "A" is statistically different from "B", "C", and "D", etc). PP had a tensile MOE and tensile strength of 1.43 GPa and 29.5 MPa, which are the lowest values among all the composites. Under the tensile load, PP sample responded with an initial elastic deformation, followed quickly by a viscoelastic part, where the stress gradually increased to reach a maximum at a yield point. After the yield point, continued deformation resulted in necking and propagation of neck along the sample length. The stress decreased towards a plateau value with the occurrence of cold drawing until the specimen failed.

The tensile MOE of PP was calculated using the elastic behavior during the tensile test while the tensile strength was derived from the yield point. Addition of two weight percentage of MAPP pellets into PP did not change the tensile behavior of PP. The obtained tensile MOE and tensile strength are not significantly different from pure PP (table 3 and FIG. The tensile deformation processes observed in CNFs reinforced PP were different from pure PP. All the samples failed at lower tensile strain compared to pure PP. The tensile strains at the maximum load of all the composites are also decreased. The data measured during the tensile test are shown in Table 2. The statistical analysis on the tensile strains at the maximum load for all the composites is conducted at a 0.05 significance level. As seen in table 2, addition of 2 wt. of MAPP into PP did not change the tensile strain (9.2%) at the maximum load while addition of CNFs (treated and untreated) significantly decreased the tensile strain at the maximum load. With the addition of CNFs into the PP at 6 wt. %, the tensile MOE and tensile strength of the composite are increased to 1.71 GPa and 30.4 MPa, which corresponds to the improvement about 20% in MOE and 3% in strength compared to pure PP. At the same time, the tensile strain at the maximum load decreased from 9.2% to 6.4%, indicating more brittle failure of PP+CNF than PP. Addition of CNFs treated by MAPP (either emulsion or pellet) into pure PP resulted in composites with further higher tensile MOE and tensile strength (Table 3).

The tensile MOE (1.96 GPa) of PP reinforced by CNFs treated with MAPP emulsion (PP+MAPP_CNF) is about 37% higher than that of pure PP (1.43 GPa) and composite produced by addition of MAPP pellets into the PP/CNFs system (PP+MAPP+CNF) showed about 36% higher tensile MOE (1.94 GPa) than PP. Simultaneously, the tensile strain at the maximum load decreased from 9.2% for PP to 6.1% and 6.7% for PP+MAPP_CNF and PP+MAPP+CNF, respectively. Tensile MOE is related to the ratio between stress and strain at the elastic stage of a tensile test. The tensile MOE of the reinforced composites is generally determined by the elastic properties of their components. With the addition of stiffer CNFs in PP, the composite modulus can be easily improved. On the molecular level, the motion of PP molecules in CNFs reinforced PP composites was restrict by CNFs, resulting in higher stress at the elastic stage of the tensile test compared to the stress in pure PP. It is noteworthy that the addition of MAPP in the composite of pristine CNFs reinforced PP, which was used to increase the interfacial adhesion between CNFs and PP, significantly improved the tensile MOE. This phenomenon is seldom observed in reinforced polymer composites (see Fu et al., Effects of particle size, particle/matrix interface adhesion and particle loading on mechanical properties of particulate-polymer composites, 2008, *Composites: Part B*, 39: 933-961). The tensile MOE is measured at the elastic deformation area with a small amount of strain. There was insufficient deformation to cause interface separation in the elastic range. The increased interfacial bond may not be able to improve the tensile MOE. Therefore, without wishing to be held to a particular theory, for PP reinforced by MAPP emulsion treated CNFs, the higher tensile MOE could be caused by: (1) the higher content of CNFs in the spray-dried sample of MAPP_CNF and/or (2) the different particle size distribution of MAPP treated CNFs and pristine CNFs.

In the sample of spray-dried MAPP_CNF, MAPP content could be lower than the designed value while the CNFs content could be higher, resulting in the higher weight percentage of CNFs in the final composites. The modulus of reinforced composites consistently increases with increasing content of reinforcement. Addition of MAPP pellets in the system of PP/CNFs increased the compatibility between CNFs and PP, facilitating the even dispersion of CNFs in PP. As a result, the tensile MOE was improved. Alternatively or additionally, the improved tensile MOE could also be associated with the crystalline structure of the composite. Regarding tensile strength, PP reinforced by MAPP pellet treated CNFs (32.8 MPa) is about 11% higher than that of pure PP (29.5 MPa). With the reinforcement of MAPP emulsion treated CNFs, the tensile strength of PP increased to 31.2 MPa, which is about 6% higher than that of pure PP (Table 3). As used herein, the tensile strength of the composite is defined as the yielding stress that the composite can sustain under uniaxial tensile loading. The yielding point is considered to be associated with the onset of significant plastic flow. On a molecular level, the yielding behavior is associated with inter-chain sliding, chain segmental motion, and chain reconformation.

With the introduction of stiff CNFs in PP, the mobility and deformation of the matrix are mechanically restrained. These mechanical restrictions may partially increase the stress transformation between the PP molecules and CNFs, especially for high aspect ratio of reinforcements. In addition, the long and skinny fibrous CNFs shown in FIG. 3 may entangle with the PP molecules, contributing to the improvement in strength. However, the effect of mechanical restriction is limited. As a result, the tensile strength of pristine CNFs reinforced PP was increased only by three percentages compared to pure PP. After the MAPP treatment, the tensile strength of the composites were 6 or 11% higher than PP.

Figure 5B:
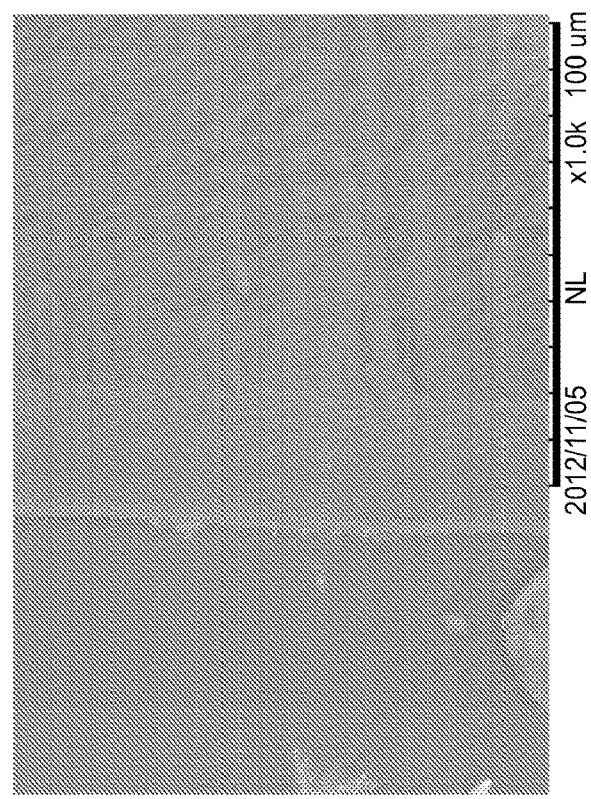
FIG. 5A-F shows exemplary SEM micrograms of composites comprising PP and/or PP+MAPP. Panel A: fractured sample surface, panel B: fractured sample cross-section, panels C, D, E, and F: show exemplary regions 1, 2, 3, and 4 in sample cross-section.
Figure 5A:
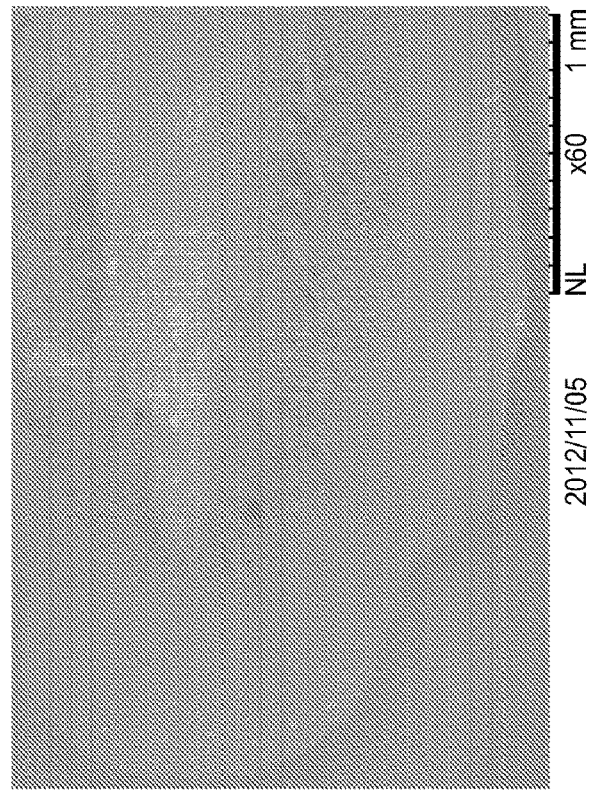
Figure 5D:
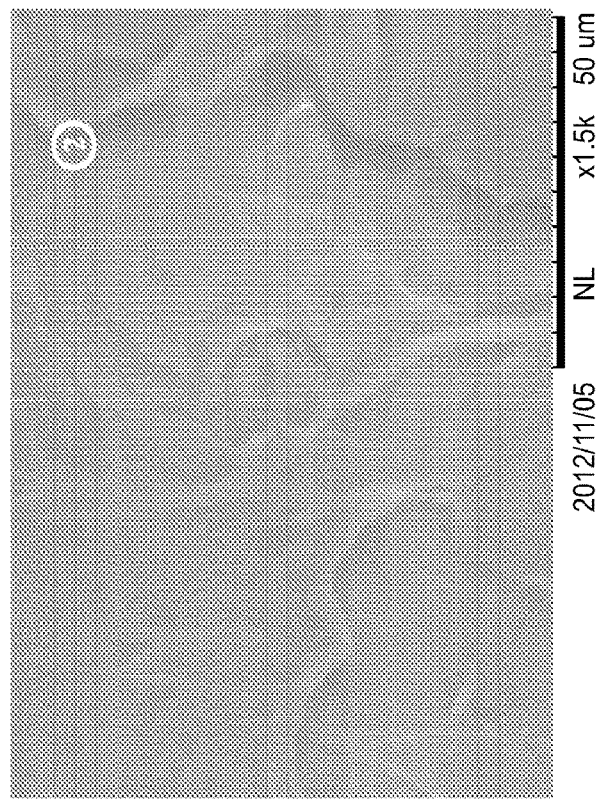
Figure 5C:
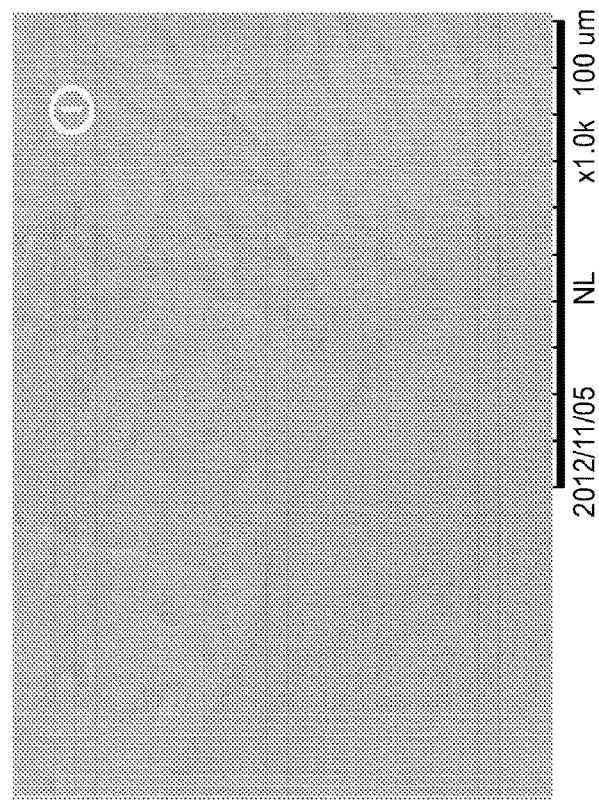
Figure 5F:
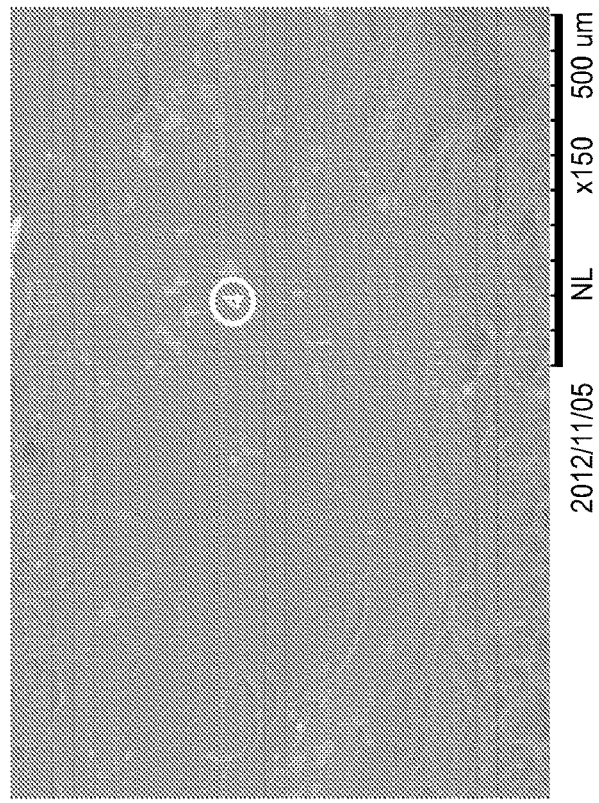

When the coupling agent of MAPP is introduced, the compatibility between PP and CNFs was increased and the polymer chains neighboring CNFs may bond to the filler surface and form a layer of immobilized polymer chains. Thus the yield stress increase compared with untreated CNFs as a result of the enhanced compatibility. These observations are consistent with the melt flow index data. With the treatment of MAPP, lower MFI (higher viscosity) were obtained for treated CNFs reinforced PP composites (table 2). It was suggested that the mobility of PP macromolecules is much more restricted as a result of stronger interaction between polymer and treated CNFs than that in pristine CNFs reinforced PP. Characterization of the composite fracture surfaces using SEM further demonstrate this theory, which is discussed in the following section.

fracture morphologies are observed in FIG. 5B: region 1, crazing-tearing; region 2, brittle fracture with ductile pulling of fibrils/microfibrils; region 3, fibrillation (disentanglement); and region 4, scission. The morphology in region 1 of FIG. 5B is similar to the fracture morphology formed in FIG. 5A, which is defined as crazing-tearing in the study of Dasari et al. (2003). The higher magnification of crazing-tearing fracture morphology is shown in FIG. 5C. As the tensile strain continue to increase, more and more voids are created with the slippage of the crazing and tearing bands, resulting in brittle failure as shown in region 2 of FIG. 5B. The higher magnification SEM microgram of region 2 in FIG. 5B is shown in FIG. 5D. Although the region appears to be brittle, partial fibrillation of PP was observed. Unbroken fibrils continued to deform plastically as disentangle-

TABLE 3

The mechanical Properties of Composites

| Composite | Tensile properties | | | | Flexural properties | | | | Impact resistance | |
|---|---|---|---|---|---|---|---|---|---|---|
| | MOE$^a$ (GPa) | | Strength (MPa) | | MOE (GPa) | | Strength (MPa) | | (kJ/m$^2$) | |
| PP | 1.43 ± 0.09$^b$ | [C]$^c$ | 29.5 ± 0.4 | [D] | 1.35 ± 0.02 | [C] | 46.9 ± 1.4 | [B] | 3.1 ± 0.6 | [B] |
| PP + MAPP | 1.50 ± 0.13 | [C] | 29.9 ± 0.4 | [D] | 1.46 ± 0.09 | [B] | 50.5 ± 2.3 | [A] | 3.5 ± 0.3 | [A] |
| PP + CNF | 1.71 ± 0.05 | [B] | 30.4 ± 0.5 | [C] | 1.60 ± 0.04 | [A] | 52.4 ± 1.4 | [A] | 3.0 ± 0.4 | [B] |
| PP + MAPP_CNF | 1.96 ± 0.09 | [A] | 31.2 ± 0.3 | [B] | 1.62 ± 0.07 | [A] | 51.4 ± 1.9 | [A] | 3.0 ± 0.4 | [B] |
| PP + MAPP + CNF | 1.94 ± 0.16 | [A] | 32.8 ± 0.5 | [A] | 1.63 ± 0.05 | [A] | 50.1 ± 4.1 | [A] | 3.8 ± 0.3 | [A] |

$^a$= Modulus of elasticity;
$^b$= standard deviation;
$^c$= The letter A, B, C, and D represent the significant levels in statistical analysis.
The values with different letters are significantly different form one another as described for Table 2.

The deformation and microstructure evolution of the semicrystalline PP under tensile load has been studied intensively. In this study, the sample surface after necking was characterized directly using Hitachi Tabletop Microscope SEM ™ 3000. The SEM micrograms of PP and PP+MAPP are shown in FIG. 5. Addition of MAPP pellets in PP did not appear to change the fracture morphology of PP. Under tension, the spherulitic texture of PP is deformed. During the sample necking phase (after yielding), the initial spherulitic structure of PP converts to an oriented and elongated structure as shown in FIG. 5A. At the same time, the plastic deformation (chain slip) on the top surface form a fibrous structure oriented at an angle of about 45 degree to the tensile direction.

According to the theory of Dijkstra et al. (A microscopy study of the transition from yielding to crazing in polypropylene, 2002, *Polymer Engineering and Sci.*, 42(1): 152-160), the direction at 45 degree to the tensile axis is the principal shear stress direction, i.e., the optimum position for the PP chain slip. Failure of the outer PP layer induced by crack, which was initiated by crazing, was also observed in FIG. 5A. The initial craze formed at the yield point of tensile test propagates through the cross-section with the formed fibrous structures stretching in the tensile axis. Micro-voids are generated because of fragmentation and splitting of the stretched fibrils. With further increase in tensile strain, coalescence of the micro-voids forms larger size void or crack, resulting in failure on the outside layer of PP shown in FIG. 5A. Fine crazing and tearing bands along the tensile axis can also be observed after the failure of outer layer in FIG. 5A. Additional stress-whitening occurred at the same time as crazing started and also in the necking phase during the tensile test.

Figure 5E:
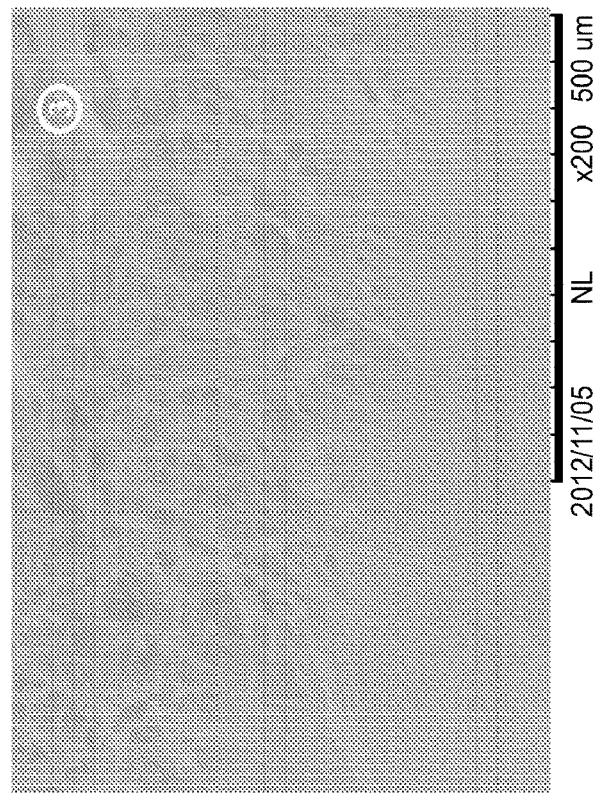
Figure 6B:
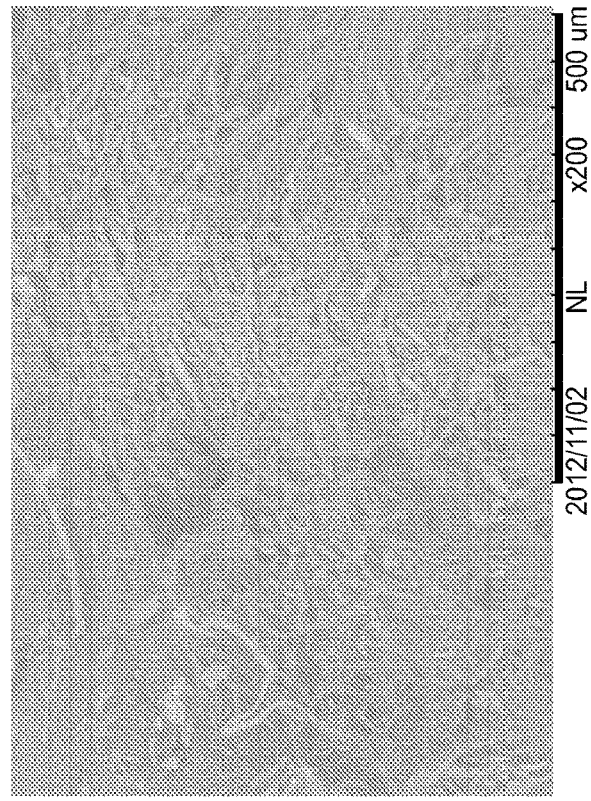
FIG. 6A-F shows exemplary SEM micrograms of CNF-reinforced PP. Panel A: PP+MAPP_CNF, panels B and C: PP+CNF, panel D: PP+MAPP_CNF, panels E and F: PP+MAPP+CNF.
Figure 6A:
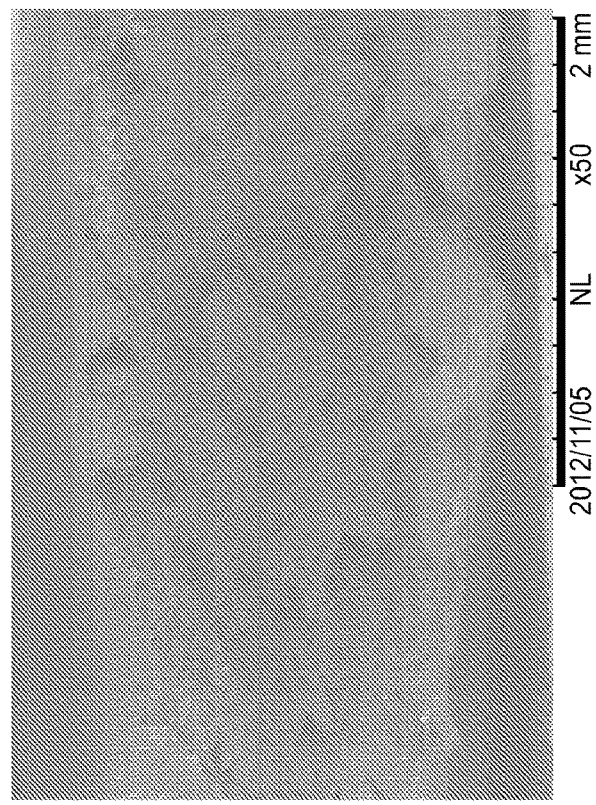
Figure 6D:
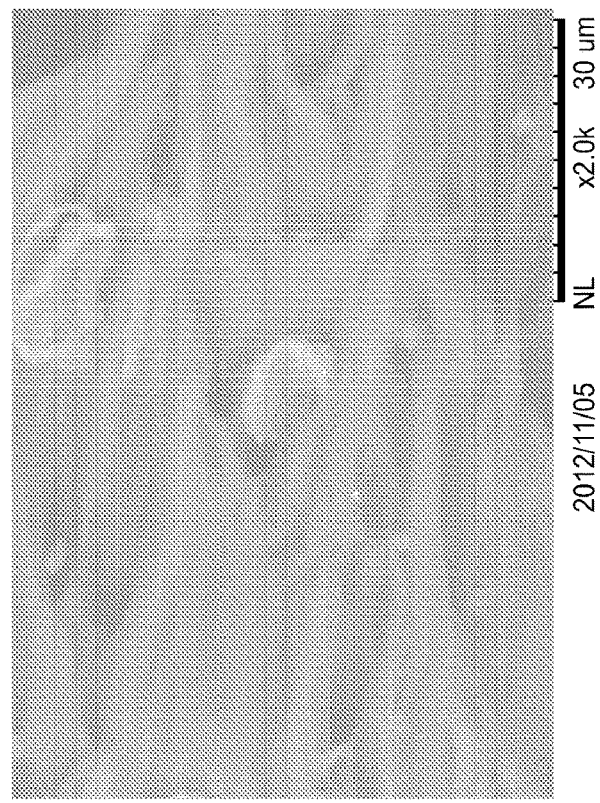
Figure 6C:
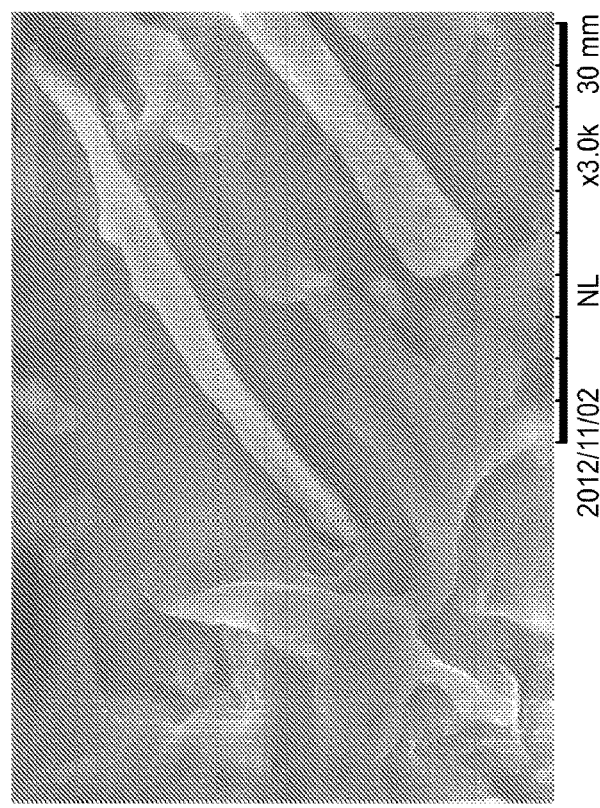
Figure 6F:
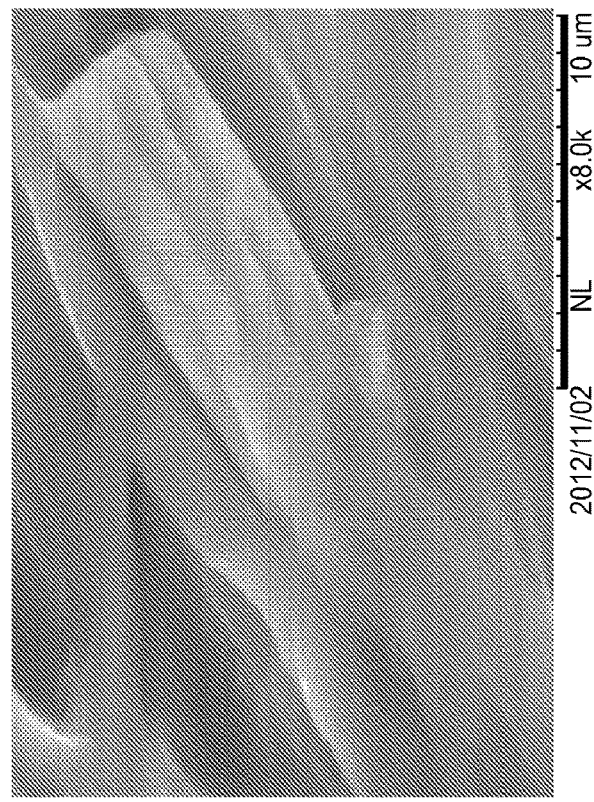
Figure 6E:
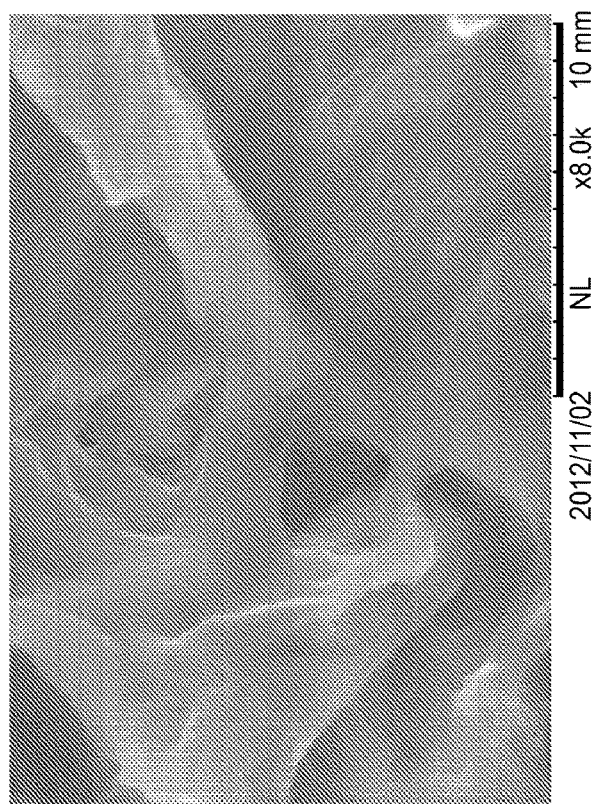

The cross-sections of broken samples after the tensile test were also examined using SEM (FIG. 5B). Four different ment of fibrils occurred. The region 2 is the transition phase from crazing-tearing of region 1 to fibrillation occurred in region 3 of FIG. 5B. High density fibrillation of the stretched crazing bands is observed in region 3. Under the tensile load with the decreasing cross-section area, continuing slippage of fibril structures resulted in disentanglement crazing at high tensile strain, forming the fibrillation morphology. As the fibrillation grows inwards, the center part of the specimen cannot sustain the tensile stress. A brittle fracture with chain scission occurred in region 4 of FIG. 5B. The higher magnification SEM micrograms of regions 3 and 4 are shown in FIGS. 5E and F.

The fracture surface morphologies of CNFs (treated and untreated) reinforced PP are shown in FIG. 6. As shown in FIG. 6, addition of CNFs in PP completely changed the fracture morphologies. Only one type of fracture surface morphology was observed. All the fracture surfaces of the composites become rough compared with pure PP (FIG. 6A). In the composites, PP and CNFs composed a heterogeneous system with different resistance capacity to the applied force. Under the uniaxial tensile load, non-consistent motions between PP and CNFs occurred and cause debonding between PP and CNFs, forming the fracture morphology of fibrillation as shown in FIG. 6B. At the same time, well-dispersed CNFs in PP can be observed. The higher magnification SEM micrograms of CNFs in PP are shown in FIGS. 6C, D, E and F. FIG. 6C shows no connection between CNFs and PP in the sample of pristine CNFs reinforced PP (PP+CNF) while FIGS. 6E and F indicates strong interactions between CNFs and the polymer matrix in the sample of PP+MAPP+CNF. Thus a significantly higher tensile strength (32.8 MPa) was obtained for PP+MAPP+CNF compared to PP+CNF (30.4 MPa).

For the sample of PP+MAPP_CNFs, the tensile strength located between PP+CNF and PP+MAPP+CNF (Table 3).

Examination of the fracture surface of PP+MAPP_CNF shows no interaction between CNFs and polymer matrix (FIG. 6D), a similar case to pristine CNFs reinforced PP. However, the tensile strength of PP reinforced by MAPP emulsion treated CNFs is higher than that of pristine CNFs reinforced PP. One explanation is that the MAPP emulsion treatment worked but it is not as efficient as MAPP pellet treatment. During spray-drying of MAPP emulsion treated CNFs, the MAPP molecules may be buried inside of CNF agglomerates, preventing contact with PP in extrusion process. The possibility of excluding MAPP during the spray-drying process may contribute to the different mechanical properties, too. The different particle size distributions may also offer another explanation. Therefore, the process of MAPP emulsion treatment on CNFs needs to be optimized. At the same time, PP reinforced with MAPP emulsion treated CNFs showed lower tensile strain (6.1%) at the maximum load compared to PP reinforced with CNFs (6.4%) and MAPP pellet treated CNFs (6.7%). MAPP emulsion treatment on CNFs resulted in a greater proportion of relative large particle size (84.3-266.7 µm) after spray-drying compared with spray-dried pristine CNFs. The relatively greater proportion of large particle size may cause the lowest tensile strain at the maximum load for PP reinforced by the MAPP emulsion treated CNFs.

Figure 7:
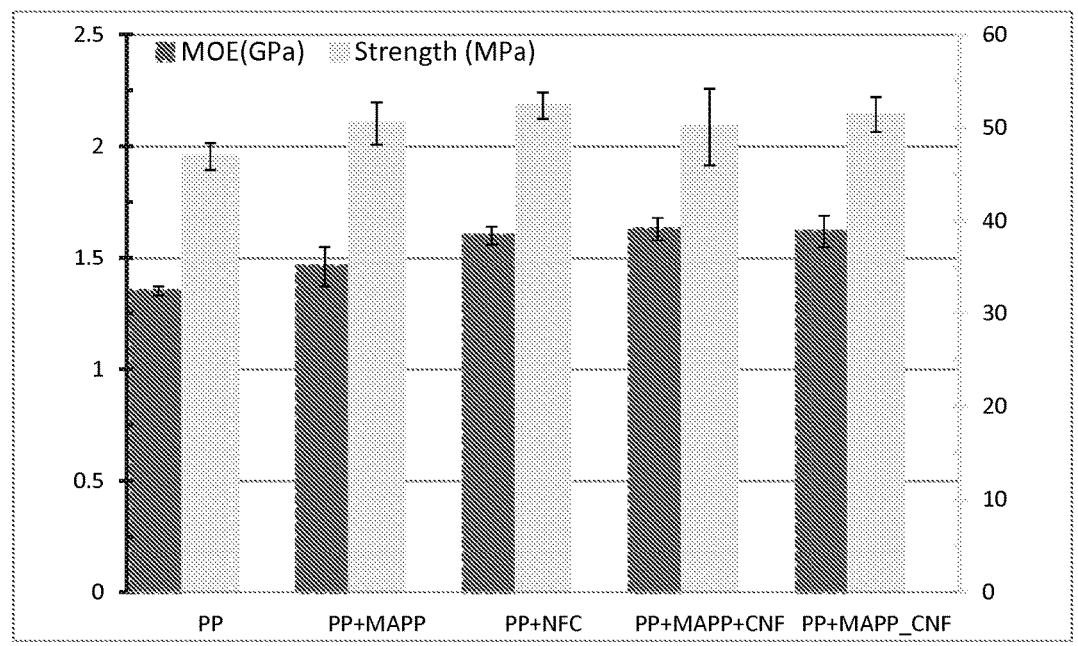
FIG. 7 shows an exemplary graph of the modulus of elasticity and tensile strength of certain embodiments as tested according to ASTM D 790-10.

The flexural properties of all the composites are tested according to ASTM D 790-10 and the data are shown in Table 3 and FIG. 7. During the flexure test, all the composites did not yield or break within 5% strain limit. The reported strength data in Table 3 and FIG. 7 are calculated based on the 5% strain limit. The lowest flexural MOE and flexural strength is pure PP with the values of 1.35 GPa and 46.9 MPa. All the other composites with addition of MAPP and/or CNFs showed significant improvement on flexural MOE and flexural strength (Table 3). Adding MAPP pellets at 2 wt. % into PP increased the flexural MOE and strength to 1.46 GPa and 50.5 MPa, which correspond to about eight percentage improvement in both MOE and strength. Adding CNFs in pure PP significantly improve the flexural MOE to 1.60 GPa while the flexural strength is not significantly different. MAPP treatment on CNFs did not appear to change the Flexural MOE or strength significantly (Table 3). The highest flexural MOE and flexural strength are 1.63 GPa and 52.4 MPa, which represent about 21% and 12% improvement. Flexural behaviors of the composites are slightly different from the tensile performance. The flexural properties is a compound characteristic of tensile and compression. Additionally, the flexural testing was conducted at an outer fiber strain rate of 0.01 $min^{-1}$ while the initial outer fiber strain rate of tensile test is 0.1 $min^{-1}$. The mechanical properties and morphologies of fracture surface of homopolymer polypropylenes and its filled composites are sensitively influenced by the strain rate.

Figure 8:
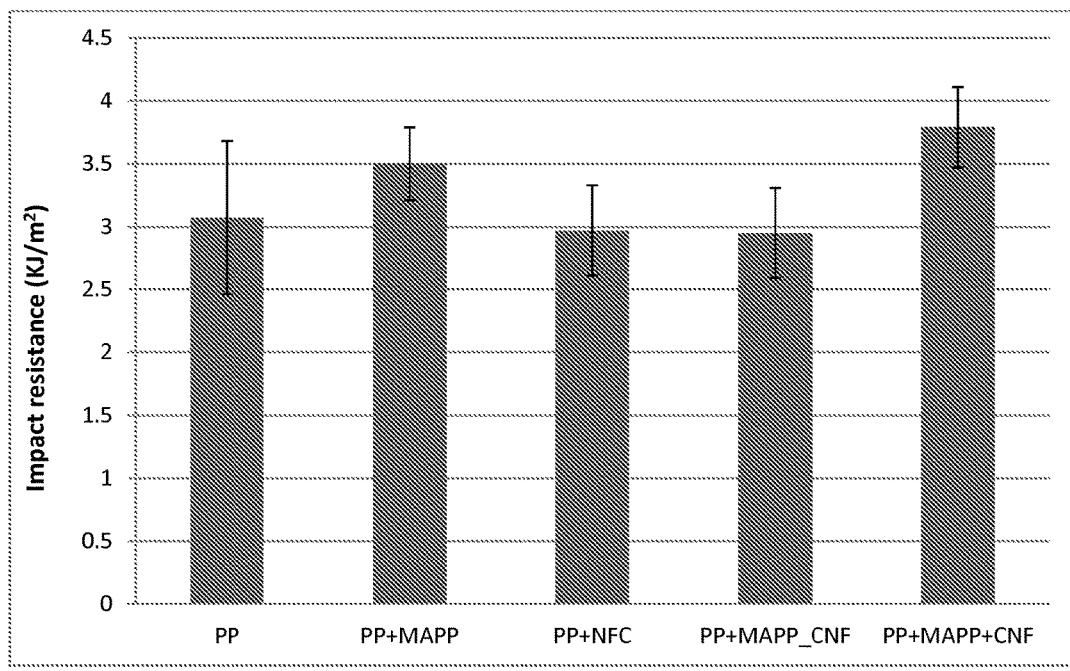
FIG. 8 shows a graph of impact resistance of certain embodiments.
Figure 9A:
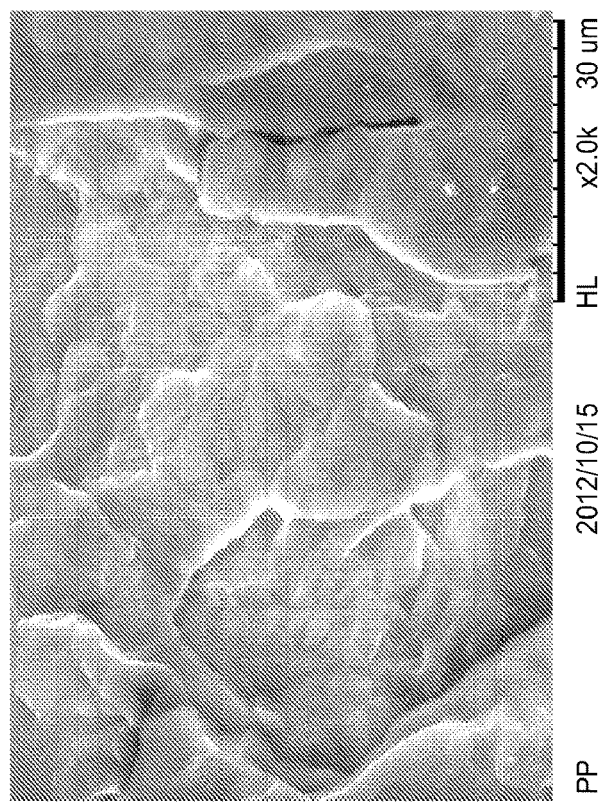
FIG. 9A-F show exemplary fracture cross-sections of certain embodiments after impact tests at 120×, 200×, or 2,000× magnification. Panels A and B: PP, panels C and D: PP+CNF, panels E and F: PP+MAPP_CNF.

The Izod impact property with notching for all the composites in this Example were measured according to ASTM D 256-10. The impact resistance data are shown in Table 3 and FIG. 8. The statistical analysis was conducted on the impact resistance at a 0.05 significance level. The impact resistance of pure PP is 3.1 $kJ/m^2$. The fracture cross-section was examined using SEM and the micrograms are shown in FIGS. 9A and B. The low magnification microgram (FIG. 9A) indicates that the fracture initiated at a distance (about 300 µm) from the notching line (the white arrow in FIG. 9A) and propagated outwards towards the surface of the sample.

Figure 9B:
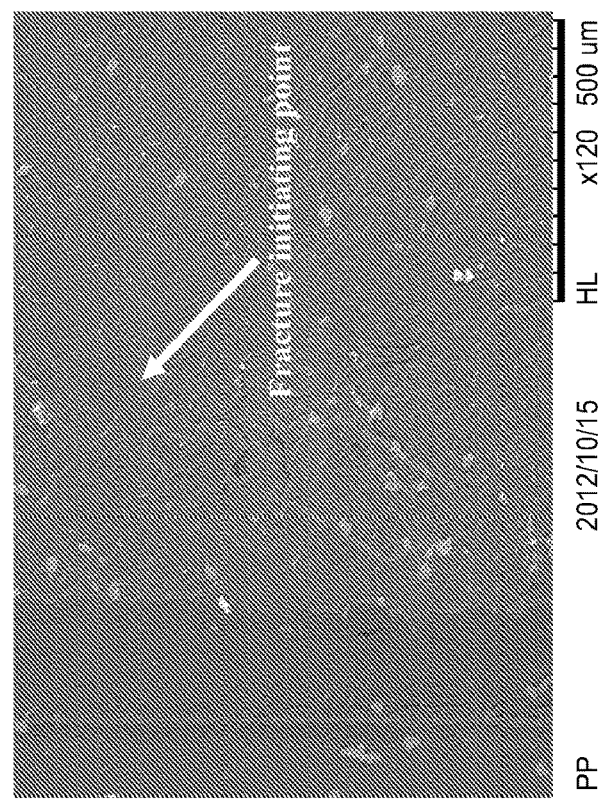
Figure 9D:
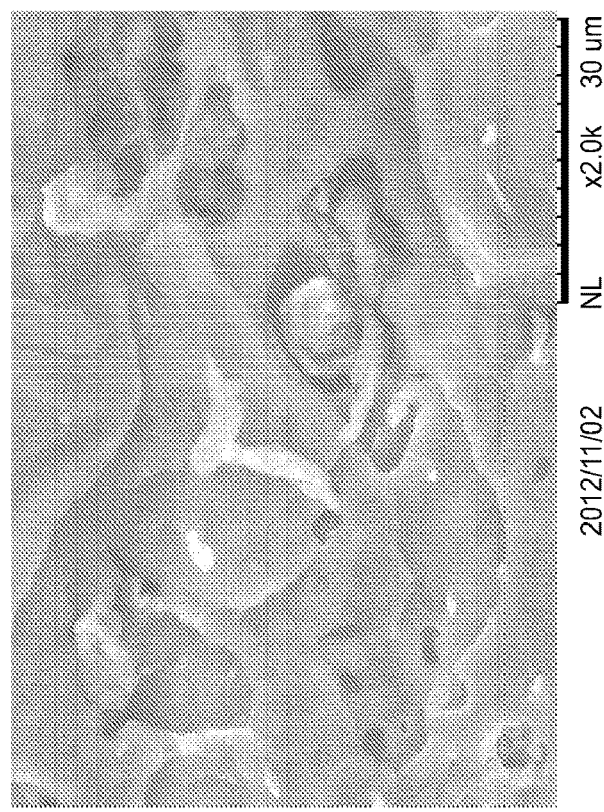
Figure 9C:
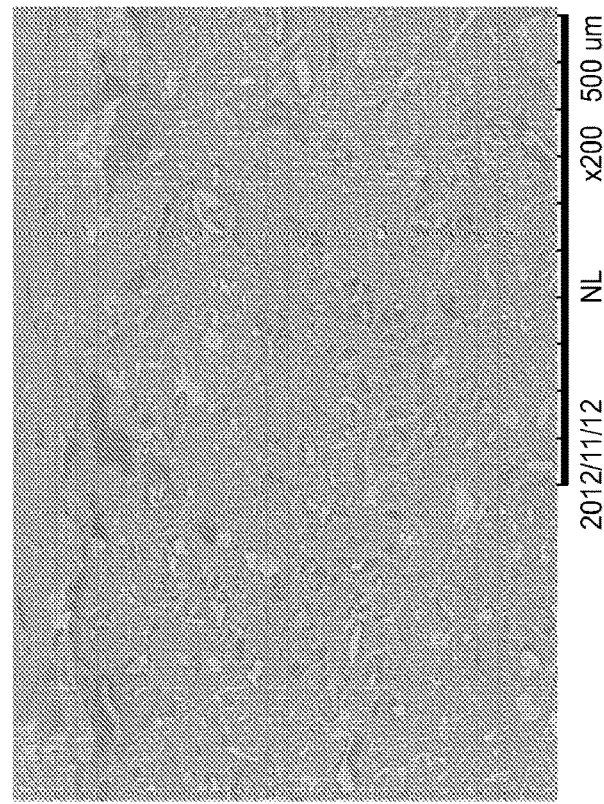

The fracture initiation point was the weakest point and failed first with concentrated stress. In the Izod impact test, the pendulum act fast on the notching side of the sample, resulting in higher strain rate compared to the tensile test. At this high strain rate, the fracture morphology tends to be more brittle. No crazing-tearing or fibrillation morphology was observed. Under this brittle fracture, the spherulitic morphology of PP can be easily observed on the surface (FIG. 9B). Addition of 6 wt. % of CNFs in PP slightly decreased the impact resistance to 3.0 $kJ/m^2$ which is not statistically significantly different from pure PP. The morphology of the fracture surface was changed completely. Brittle and partial fibrillation was observed on the surface (FIG. 9C). The fracture initiation point is difficult to estimate under this situation.

Under the load applied by the pendulum, non-consistent motions between PP molecules and CNFs tend to create voids. With further deformation, void coalescence finally performed, leading to the fibrillation failure at the interface of CNFs and PP. On the fracture surface shown in FIG. 9C, a big number of CNFs are exposed without any restriction. It appears that the CNFs lay on the top of polymer matrix. Simultaneously, the incompatibility between CNFs and PP created separate surfaces and voids originally in the composite, facilitating the debonding process between CNFs and PP under the load and leading to possible lower impact resistance. The separated surfaces and holes between CNFs and polymer matrix can be easily observed in the higher magnification of fracture microgram shown in FIG. 9D. Well dispersed CNFs in PP is also observed on the fracture micrograms of FIG. 9C. Addition of MAPP emulsion treated CNFs in PP did not change the impact resistance significantly compared to pure PP and pristine CNFs reinforced PP (Table 3). Previous studies on CNFs reinforced PP showed serious degradation on impact resistance with 6 wt. % loading level (see Yang et al., Characteristic impact resistance model analysis of cellulose nanofibril-filled polypropylene composite, 2011, *Composites: Part A*, 42: 2028-2035). In contrast, in this Example, the impact resistance remained the same level with pure PP. Without wishing to be held to a particular theory, it is possible that superior dispersion of the dried CNFs in PP achieved using master batch compounding process may account, at least in part, for this observed increase in impact resistance.

Figure 9F:
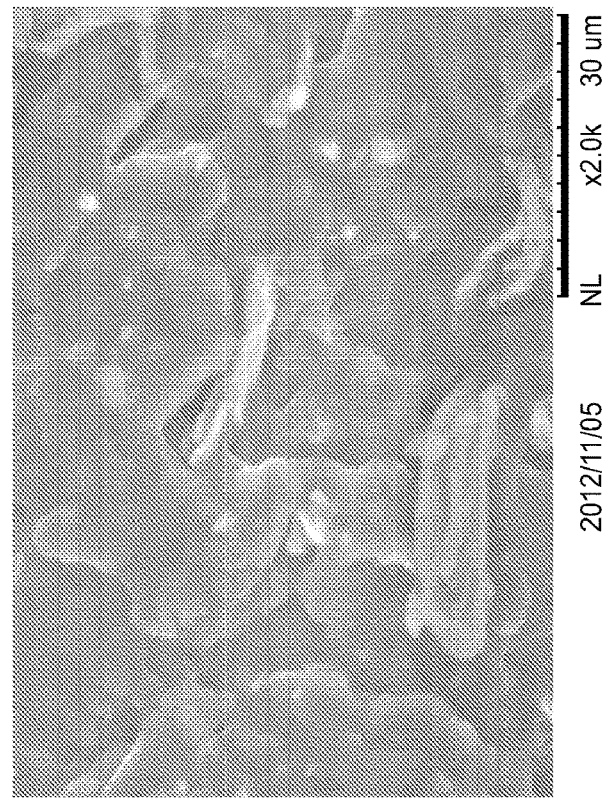
Figure 9E:
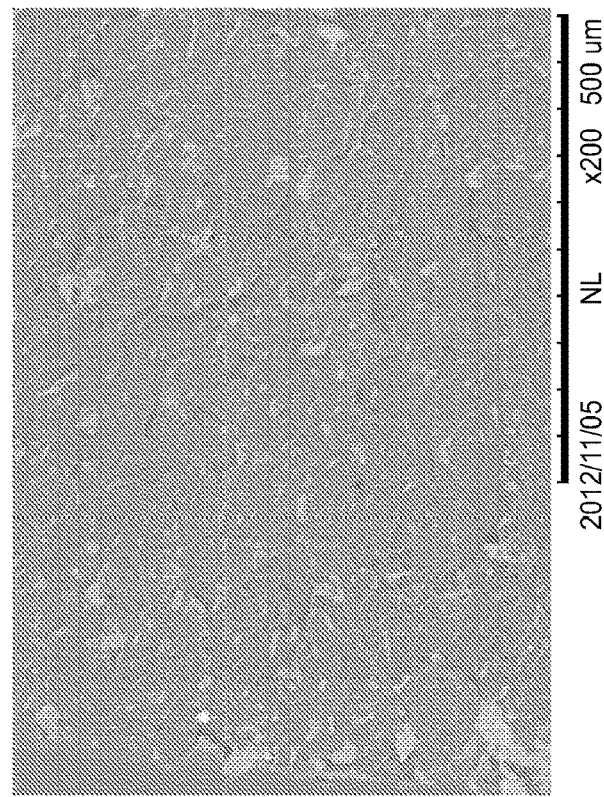

The Fracture morphologies of PP+MAPP_CNF are shown in FIGS. 9E and F. Good dispersion of MAPP_CNF was also observed. Similar to the sample of pristine CNFs reinforced PP, brittle failure and a big amount of exposed CNFs are observed on the surface. However, close-up examination of fracture surface of PP+MAPP_CNF indicated that a proportion of CNFs is bonded with the polymer matrix (FIG. 9F). MAPP emulsion treatment on CNFs built this interfacial adhesion. In general, interfacial adhesion between reinforcements and matrix has a significant effect on composite impact resistance (see Fu et al. 2008). Generally, strong adhesion leads to high impact resistance. In this case, however only a very small amount of interfacial adhesion was built between CNFs and PP and did not increase the impact resistance. The different particle size distributions of MAPP_CNFs and CNFs may also partially balance the effect of MAPP treatment.

Figure 10A:
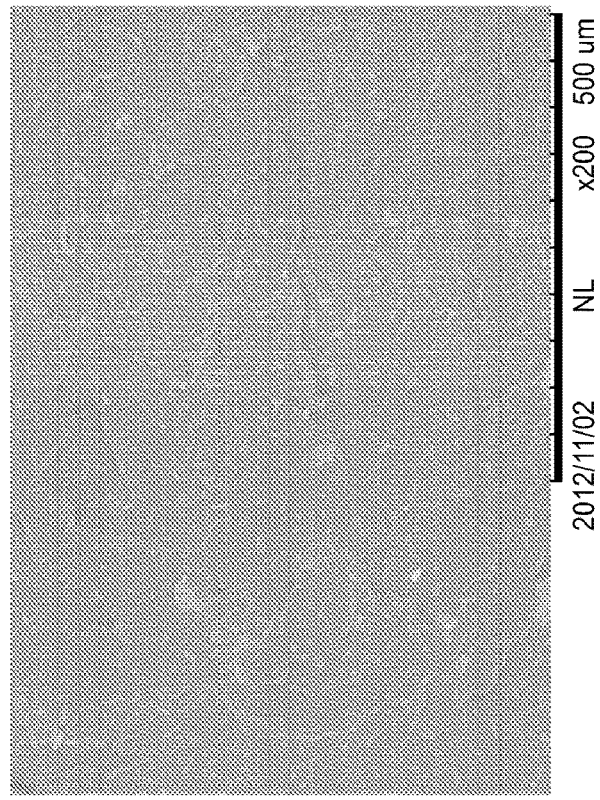
FIG. 10A-F show exemplary fracture cross-sections of certain embodiments after impact tests at 120×, 200×, 5,000×, or 10,000× magnification. Panels A, C, and E: PP+MAPP, panels B, D, and F: PP+MAPP+CNF.

Surprisingly, addition of 2 wt. % of MAPP pellets in the pure PP significantly increased the impact resistance of PP from 3.1 to 3.5 $kJ/m^2$ (approximately a 13% improvement). MAPP pellet is maleic anhydride grafted low molecular weight PP with very high melt flow index (115 g/10 minutes at 190° C. with the load of 2.16 kg). Addition of MAPP pellets in PP decreased the MFI of PP from 7.2 to 9.3 g/10 minute. The fracture surface of PP+MAPP was examined using SEM, and the micrograms are shown in FIGS. 10A, C, and E. Similar to pure PP, the fracture initiated at a distance of about 300 μm from the notching line and propagated towards the surface of the sample (FIG. 10A). The low magnification microgram of PP+MAPP (FIG. 10A) also shows that a brittle failure mode similar to pure PP was observed except a number of additional white areas included (white circular area in FIG. 10A). The close-up examination on the white circular area using SEM obtained the microgram of FIGS. 10C and E. Materials with the shape of dendritic crystal in the dimensions of several micron meters are observed.

Figure 10B:
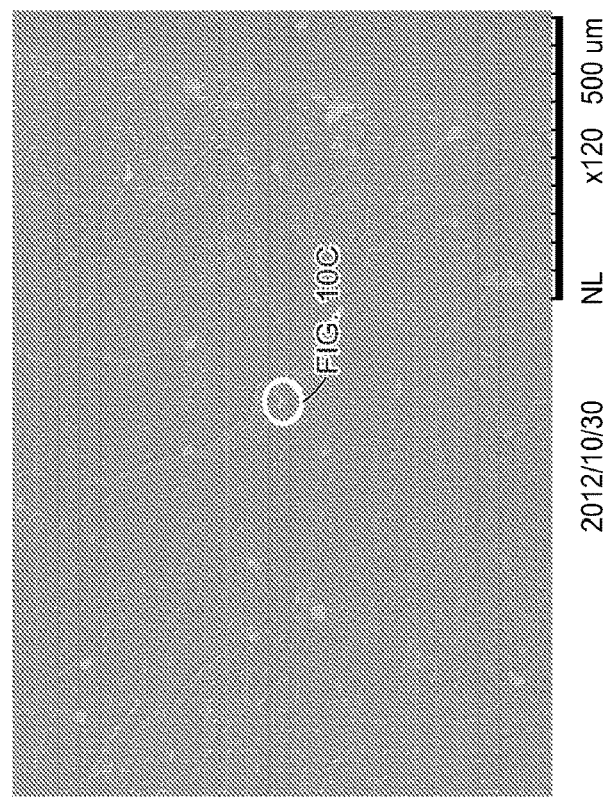
Figure 10D:
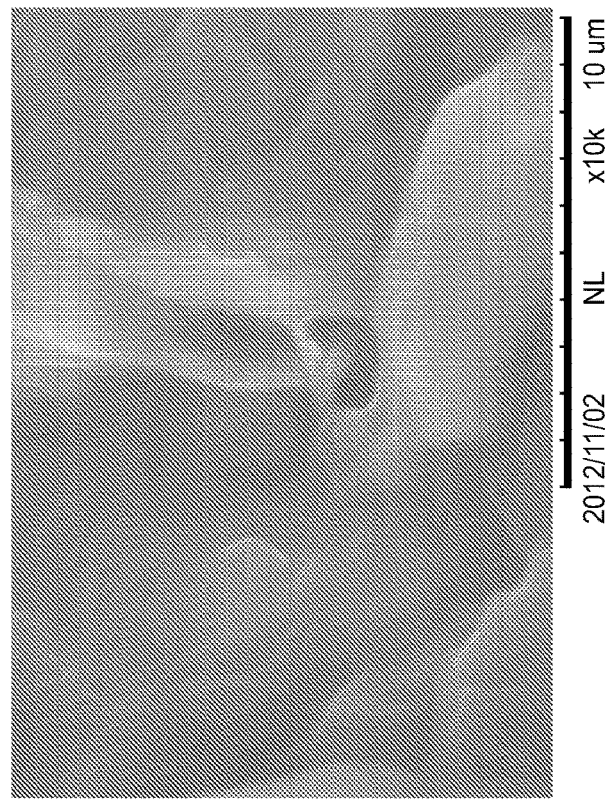
Figure 10C:
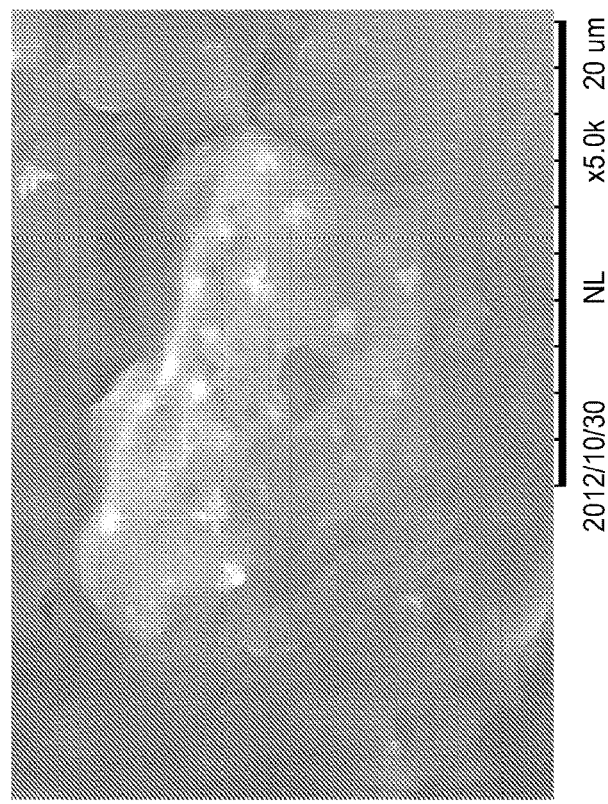
Figure 10F:
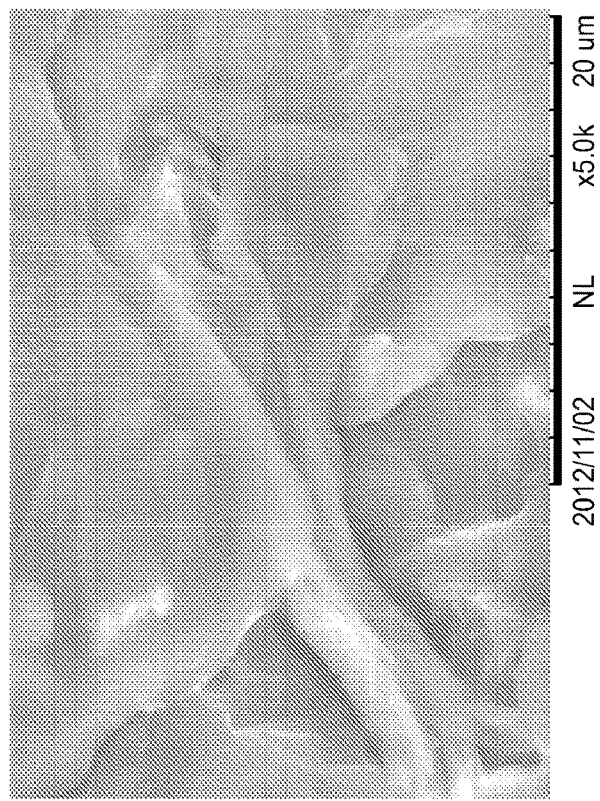
Figure 10E:
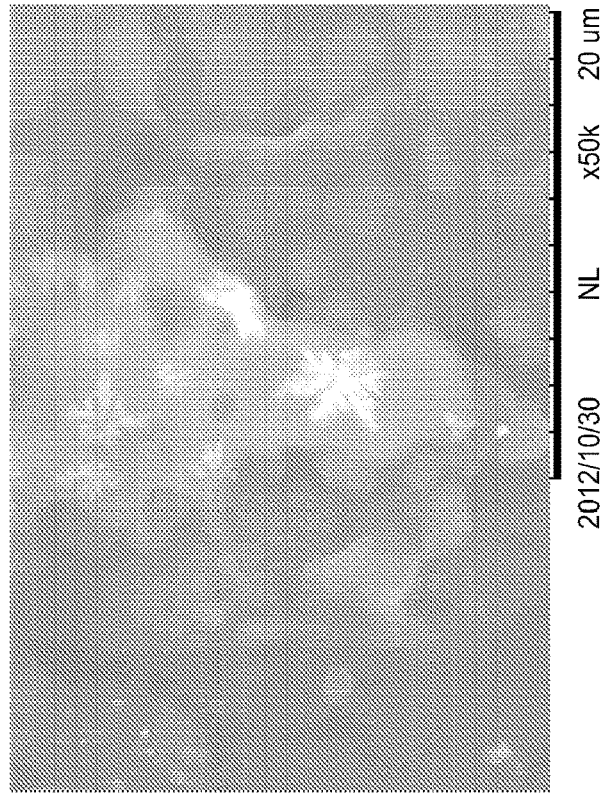

The effect of adding MAPP on the crystallization behavior of PP was previously studied, and it is thought that MAPP functions as a nucleating agent in PP and influence the crystallization of PP (see Seo et al., Study of the crystallization behaviors of polypropylene and maleic anhydride grafted polypropylene, 2000, *Polymer*, 41: 2639-2646). The dendritic shape material may represent the crystalline structure change in the mixture of PP and MAPP which possibly leads to the enhancement of the impact resistance of PP. The crystalline structure change by adding MAPP in PP may also explain the enhancement of the flexural MOE and flexural strength of PP+MAPP. When compared with PP+MAPP, composite consisted of PP, MAPP pellets, and CNFs showed a further higher impact resistance (3.8 kJ/m$^2$). It is about 23% higher than that of pure PP and 27% higher than pristine CNFs reinforced PP. The cross-section fracture morphologies are shown in FIGS. 10B, D, and F. The fracture morphology in FIG. 10B showed brittle failure mode with no observable fracture initiation point, indicating there might be no stress concentrating point during the impact test and good dispersion of CNFs. Significantly less numbers of exposed CNFs are observed. No separated surface and hole is observed. The higher magnification SEM micrograms shown in FIGS. 10D and F indicated that a strong interfacial adhesion was established. After the impact test, splitting of the CNFs was even observed (FIG. 10D). Therefore, the impact resistance of PP+MAPP+CNF was significantly increased compared to all the other composites.

In this Example, the concept of masterbatching was used to prepare cellulose nanofibrils (CNFs) reinforced polypropylene (PP) nanocomposites through extrusion process. As described above, two methods were used to modify the CNFs by maleic anhydride-grafted polypropylene (MAPP): emulsion treatment and pellet treatment. The first method was in situ modification of CNFs in original suspension with MAPP emulsion during the spray-drying process. The second method was performed using MAPP pellets when mixing spray-dried CNFs with PP during the extrusion process. As described above, slight differences in particle size distribution were observed for pristine CNFs and MAPP emulsion treated CNFs. Pure PP had the lowest melt flow index while the mixture of PP and MAPP pellets had the highest melt flow index. The melt flow indices of all the CNFs reinforced composites were fond to be located between PP and the mixture of PP and MAPP pellets. When compared to pure PP, addition of CNFs (treated and untreated) in PP resulted in increased tensile modulus of elasticity (MOE), tensile strength, Flexural MOE, and flexural strength and at the same time sustained or slightly improved the impact resistance. The best mechanical properties observed in this Example were obtained for composites comprising PP, MAPP pellets and CNFs (PP+MAPP+CNF). The tensile MOE and tensile strength were 1.94 GPa and 32.8 MPa, which represent about 36% and 11% improvement compared to the tensile MOE (1.43 GPa) and tensile strength (29.5 MPa) of pure PP. The flexural MOE of PP+MAPP+CNF (1.63 GPa) was about 21% higher than that of pure PP. The highest flexural strength was obtained for pristine CNFs reinforced PP (52.4 MPa) which is not significantly different from that of PP+MAPP+CNF (50.1 MPa). Composite of PP+MAPP+CNF also has the highest impact resistance of 3.8 kJ/m$^2$. This value is about 23% higher than that of pure PP (3.1 kJ/m$^2$). The fracture morphology examination described above indicates that good dispersion of CNFs in polymer matrix can be achieved through the masterbatching process. MAPP treatments (either emulsion or pellet treatment) enhanced the interfacial adhesion between CNFs and PP.

Example 2

In this Example, cellulose nanoparticles (CNP) were prepared from cellulose suspensions according to the patent-pending technology by Advanced Structures and Composites Center of University of Maine as described in U.S. Pat. No. 8,372,320. The average size of the CNP ranged within few micrometers including a significant amount of nano-dimensioned particles (at least 30%). The CNP was processed using conventional polymer processing methods with impact modified polypropylene (IMPP) as a polymer matrix. The loading level of CNP in this Example was 6% by weight, which was pre-coated with maleic anhydride grafted polypropylene (PP-g-MA), a coupling agent, by using a master batching process similar to that described above in Example 1. In the testing of mechanical properties, the results revealed that not the only stiffness of the resulting composite was improved but also the strength was too. The maximum observed increases were 35.66% (stiffness) and 11.25% (strength) for tensile properties, 20.74% (stiffness) and 6.73% (strength) for flexural properties, and 23.45% for impact resistivity. Without wishing to be held to a particular theory, it is possible that the improvement might be enabled from at least two effects, the first being the addition of nano dimensioned additives, and the second being a modified processing to coat the coupling agent to the additives surfaces.

In general, the addition of solid additives or fillers to thermoplastic composites increase the stiffness with a critical loading level, such as two digit percentiles, due to the much higher modulus of the fillers/additives as compared to the matrix polymer(s) themselves. However, the strength of a composite typically cannot be increased easily, because of the poor compatibility between fillers/additives and the polymer matrices. Even with a good compatibility, a long aspect ratio of fillers/additives is required. Moreover, the high loading levels of fillers/additives increase the viscosity leading to more energy requirement and low production rate. The increases shown in the mechanical properties of resulting composites in this Example using a relatively small percentage (6%) of the additives are therefore very surprising and important. One advantage provided by various embodiments include a relatively lowered cost, given the low amounts of filler/additive used, in fact, CNP can be competitive to the carbon nanotubes or even carbon fibers or glass fibers. A second advantage is the use of cellulose, which is an environmentally friendly additive.

Effects of Use of Coupling Agents with Additives

Figure 11:
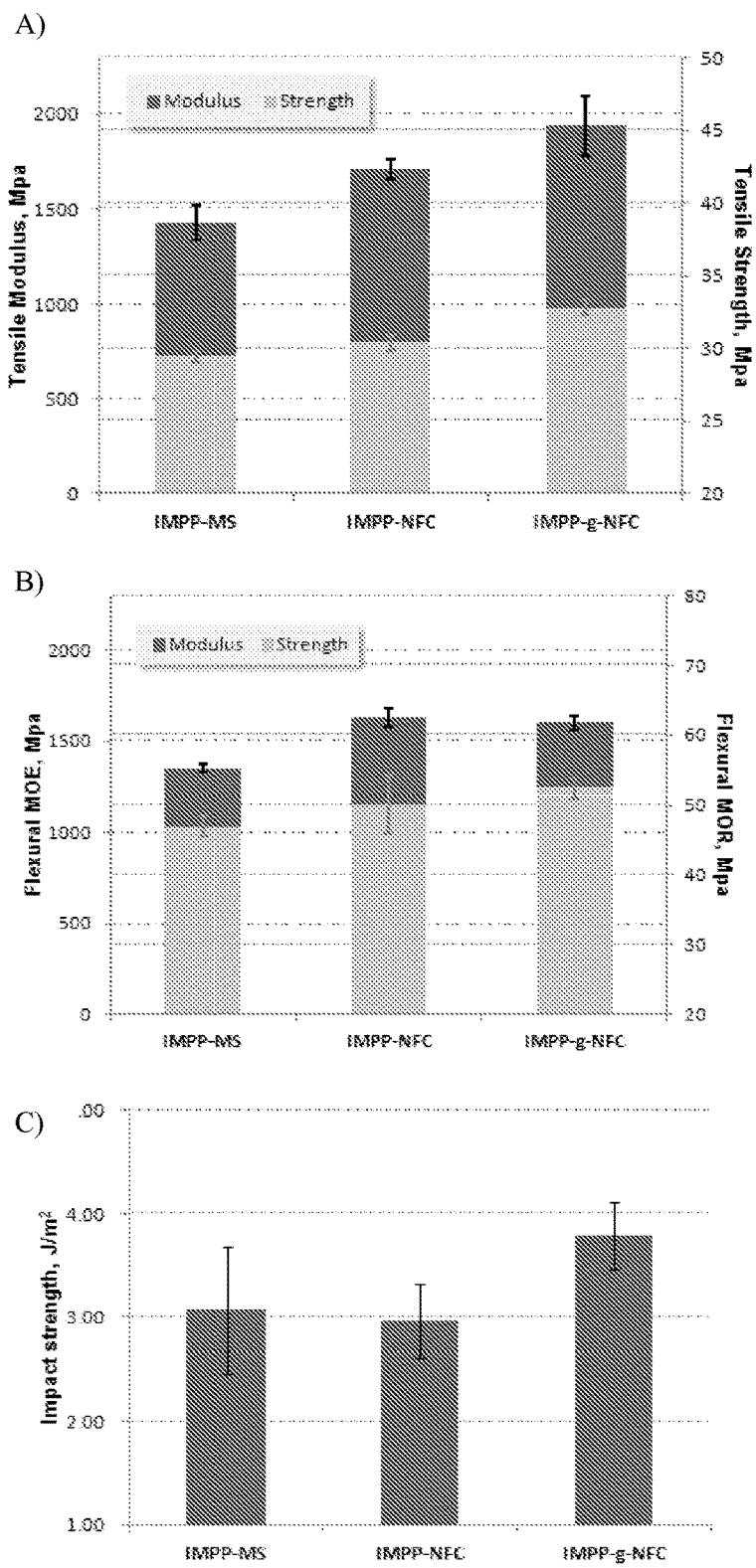
FIG. 11A-C show graphs of the mechanical properties of certain embodiments comprising cellulose nanoparticle (CNP)-reinforced polypropylene (6% loading of CNP). Panel A shows the tensile modulus and tensile strength of certain embodiments, panel B shows the flexural modulus and strength of certain embodiments, and panel C shows the impact strength of certain embodiments.

A master batch was prepared using CNP with PP-g-MA, a coupling agent, in an extrusion process. The master batch was compounded again with IMPP, resulting in 6% wt. of the loading level of CNP and 2% wt. of the PP-g-MA. The mechanical properties are shown at FIG. 11. For the sample with CNP coupled with PP-g-MA, improvements in all flexural, tensile, and impact properties were observed. (IMPP-MB: impact modified polypropylene processed for master batch, IMPP-CNP: IMPP filled with CNP only, IMPP-g-MAPP: IMPP filled with CNP and PP-g-MA).

Comparison of Mechanical Properties of Various IMPP Composites

Figure 12:
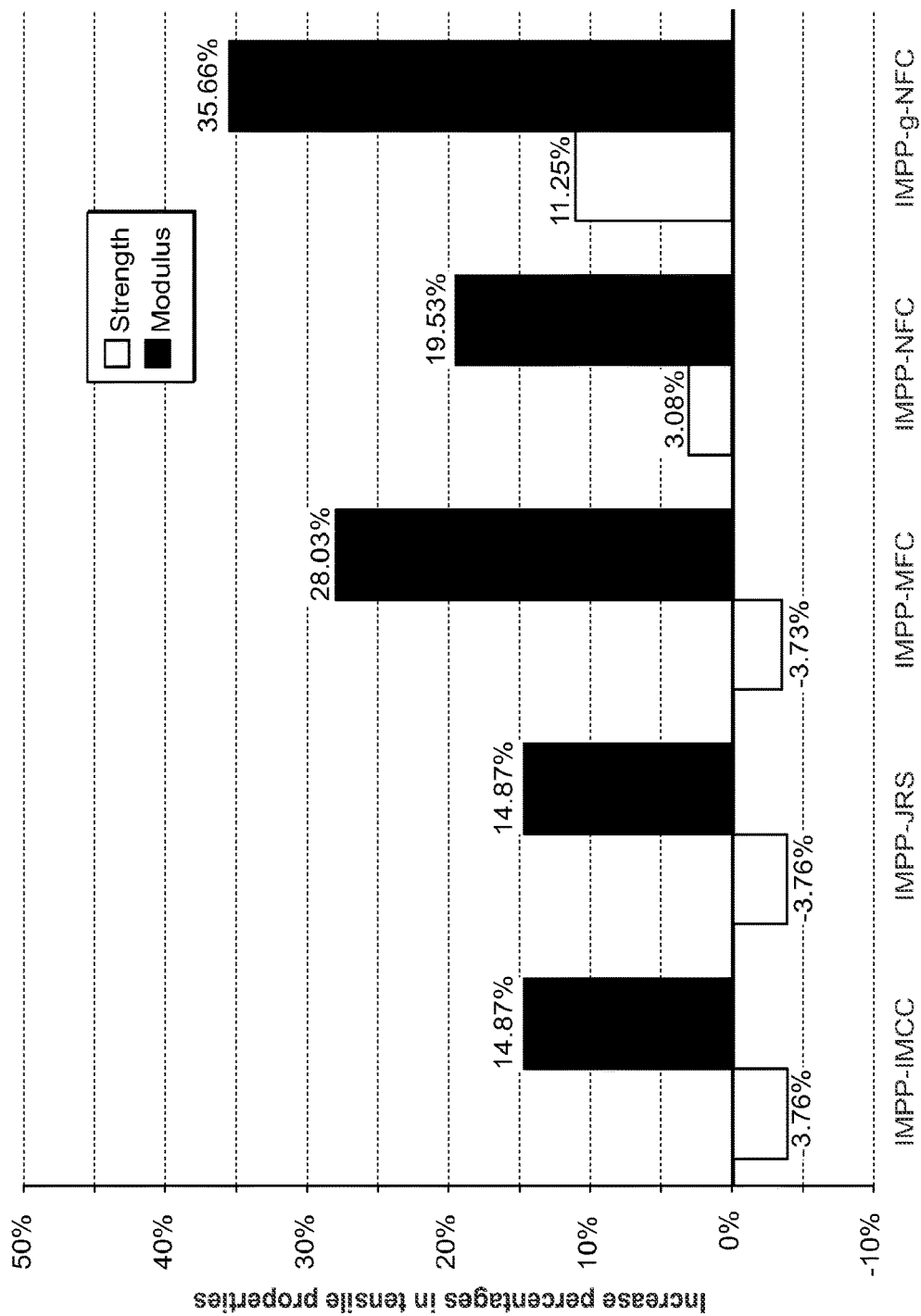
FIG. 12 shows a graph of the increase in certain tensile properties exhibited by certain embodiments.
Figure 13:
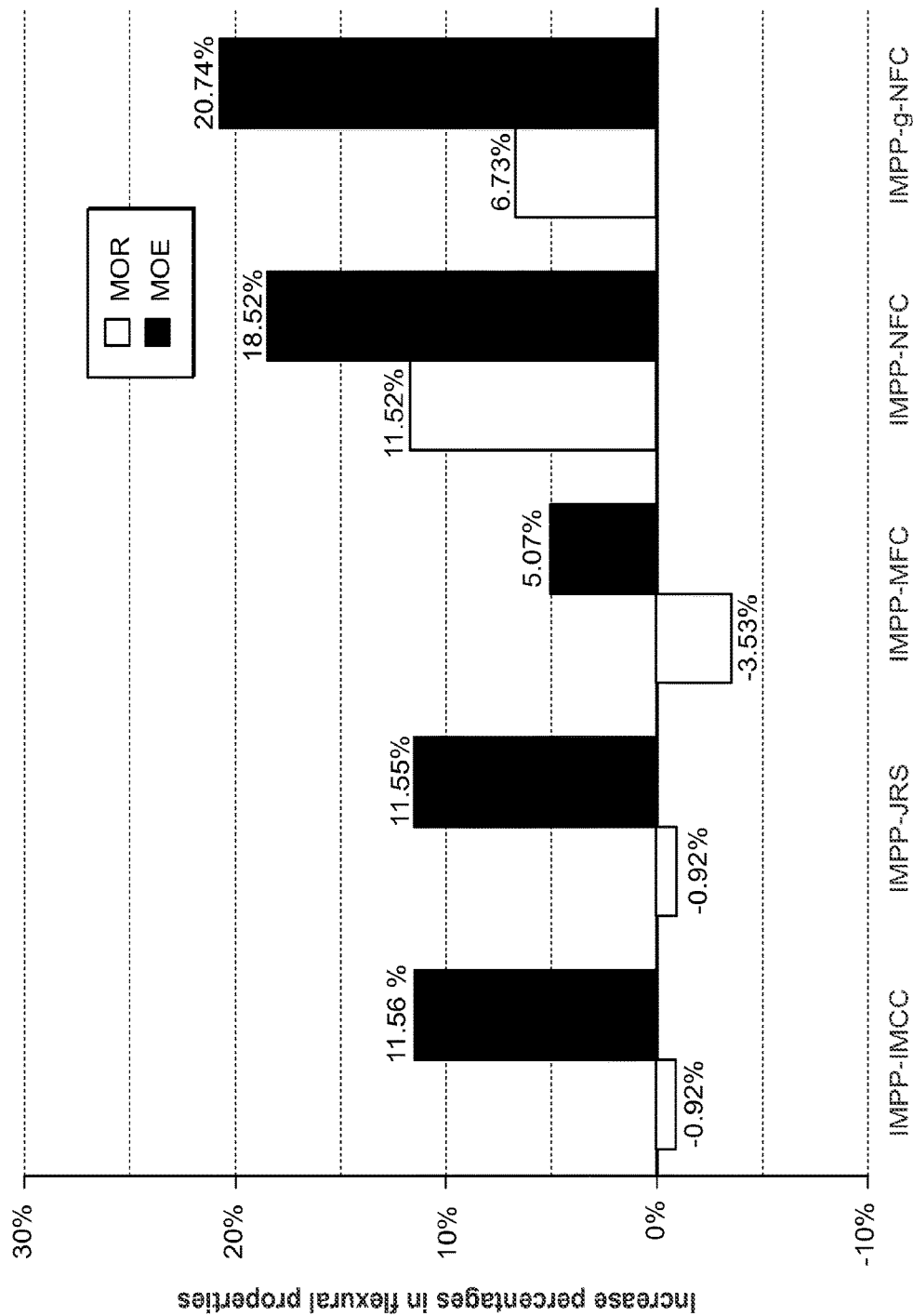
FIG. 13 shows a graph of the increase in certain flexural properties exhibited by certain embodiments.
Figure 14:
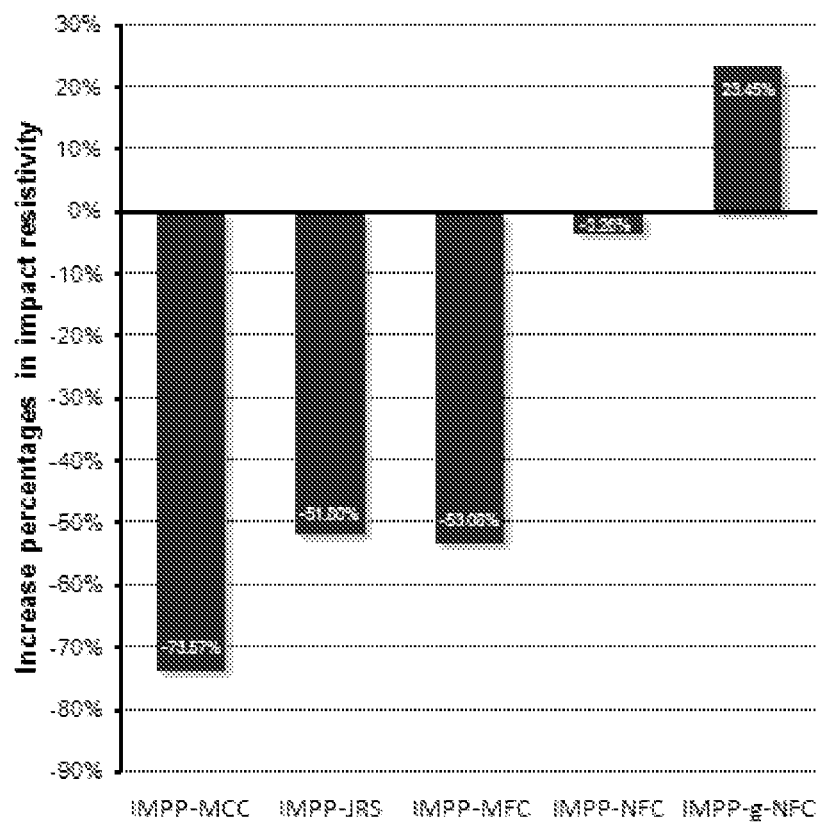
FIG. 14 shows a graph of the increase in impact strength exhibited by certain embodiments.

Several composites were prepared using various cellulosic additives to compare the effects on the mechanical properties. The nomenclatures of the sample are shown in Table 4. The samples with NFC were prepared using the mater batch process. It is shown in FIGS. 12-14 that all mechanical properties tested, including the tensile, flexural, and impact resistance properties, were significantly improved in the sample filled with NFC by the master batching method.

TABLE 4

Nomenclature of Samples

| Samples | Additives | Loading levels | Additives status |
|---|---|---|---|
| IMPP-MCC | Microcrystalline cellulose | 6%, wt. | Powder |
| IMPP-JRS | Ultra fine cellulose | 6%, wt. | Suspension |
| IMPP-MFC | Microfibrillated cellulose | 6%, wt. | |
| IMPP-NFC | Nanofibrillated cellulose | | Powder |
| IMPP-g-NFC | Treated nanofibrillated cellulose | | Powder |

The Examples presented herein describe, among other things, exemplary methods of preparing composite materials with enhanced properties and represent a new way of providing composite materials with desirable mechanical and other characteristics while required significantly less filler than other methods.

EQUIVALENTS AND SCOPE

Those skilled in the art will recognize, or be able to ascertain using no more than routine experimentation, many equivalents to the specific embodiments of the invention described herein. The scope of the present invention is not intended to be limited to the above Description, but rather is as set forth in the following claims:

The invention claimed is:

1. A method comprising
providing cellulose nanofibrils;
associating the cellulose nanofibrils with a maleic-anhydride (MA) copolymer to form a nanofibril-MA copolymer blend;
preparing the nanofibril-MA copolymer blend for addition to a matrix polymer, wherein the preparing step comprises drying the nanofibril-MA copolymer blend; and
forming a composite by associating the nanofibril-MA copolymer blend with the matrix polymer,
wherein the amount of cellulose nanofibrils in the composite is between 3% and 50% by weight of the composite.

2. The method of claim 1, wherein the drying is spray drying.

3. The method of claim 1, wherein the preparing step comprises
drying the nanofibril-MA-copolymer blend;
cooling the dried nanofibril-MA-copolymer blend; and
granulating the dried nanofibril-MA-copolymer blend to form a nanofibril-MA-copolymer masterbatch.

4. The method of claim 1, wherein the associating of the cellulose nanofibrils with a maleic-anhydride (MA) copolymer to form a nanofibril-MA copolymer blend occurs at a temperature between 130° C. and 220° C., inclusive.

5. The method of claim 1, wherein the step of associating the cellulose nanofibrils with a maleic-anhydride (MA) copolymer comprises mixing of the cellulose nanofibrils and maleic-anhydride (MA) copolymer for between 1 minute and 60 minutes, inclusive.

6. The method of claim 1, wherein the cellulose nanofibrils are in solution at the time of initiating the step of associating the cellulose nanofibrils with a maleic-anhydride (MA) copolymer.

7. The method of claim 1, wherein the maleic-anhydride copolymer comprises the dispersed phase of an emulsion at the time of initiating the step of associating the cellulose nanofibrils with a maleic-anhydride (MA) copolymer.

8. The method of claim 1, wherein the cellulose nanofibrils are substantially dry at the time of initiating the associating of the cellulose nanofibrils with a maleic-anhydride (MA) copolymer to form a nanofibril-MA copolymer blend.

9. The method of claim 1, wherein the composite is characterized as having an impact resistance that is higher than that of a composite consisting of the matrix polymer and cellulose nanofibrils.

10. The method of claim 9, wherein the impact resistance of the composite is at least 20% greater than that of a composite consisting of the matrix polymer and cellulose nanofibrils.

11. The method of claim 1, wherein the composite is characterized as having a tensile modulus of elasticity at least 35% higher than that of a composite consisting of the matrix polymer and cellulose nanofibrils.

12. The method of claim 1, wherein the composite is characterized as having a tensile strength at least 10% higher than that of a composite consisting of the matrix polymer and cellulose nanofibrils.

13. The method of claim 1, wherein the maleic-anhydride polymer is selected from a maleic-anhydride olefin polymer and a maleic-anhydride polystyrene.

14. The method of claim 13, wherein a maleic-anhydride olefin copolymer is maleic-anhydride polypropylene or maleic-anhydride polyethylene.

15. The method of claim 1, wherein the composite is formed via an extrusion, compression molding, injection molding, and/or fused layer modeling process.

16. A composite material produced according to a method of claim 1.

* * * * *